US011562259B2

(12) United States Patent
Sullivan et al.

(10) Patent No.: US 11,562,259 B2
(45) Date of Patent: Jan. 24, 2023

(54) ONLINE ASSET RECOMMENDATION SYSTEM

(71) Applicant: IRIS.TV, INC., Los Angeles, CA (US)

(72) Inventors: Thomas J. Sullivan, Los Angeles, CA (US); Joel Spitalnik, Los Angeles, CA (US); Sunil Ingle, Los Angeles, CA (US); Jared Essig, Los Angeles, CA (US); Field Garthwaite, Los Angeles, CA (US); Carl Winston Owens, Los Angeles, CA (US)

(73) Assignee: IRIS.TV INC., Los Angeles, CA (US)

( * ) Notice: Subject to any disclaimer, the term of this patent is extended or adjusted under 35 U.S.C. 154(b) by 856 days.

(21) Appl. No.: 14/811,824

(22) Filed: Jul. 28, 2015

(65) Prior Publication Data
US 2016/0026920 A1 Jan. 28, 2016

Related U.S. Application Data

(60) Provisional application No. 62/029,713, filed on Jul. 28, 2014.

(51) Int. Cl.
| G06F 16/30 | (2019.01) |
| G06N 5/04 | (2006.01) |
| G06F 16/438 | (2019.01) |
| G06F 16/9535 | (2019.01) |
| G06F 16/48 | (2019.01) |
| G06Q 30/02 | (2012.01) |

(52) U.S. Cl.
CPC ............. *G06N 5/04* (2013.01); *G06F 16/438* (2019.01); *G06F 16/48* (2019.01); *G06F 16/9535* (2019.01); *G06Q 30/0263* (2013.01)

(58) Field of Classification Search
CPC ............................ G06F 16/40; G06F 16/9535
USPC ........ 707/609, 687, 705, 769, 790, 813, 821
See application file for complete search history.

(56) References Cited

U.S. PATENT DOCUMENTS

| 6,826,559 | B1 | 11/2004 | Ponte | |
| 8,275,661 | B1 | 9/2012 | Ponte et al. | |
| 2003/0023427 | A1* | 1/2003 | Cassin | ............... H04N 21/8456 348/E7.071 |
| 2003/0217061 | A1 | 11/2003 | Agassi et al. | |
| 2005/0193335 | A1 | 9/2005 | Dorai et al. | |
| 2006/0106642 | A1 | 5/2006 | Reicher et al. | |
| 2008/0307454 | A1 | 12/2008 | Ahanger et al. | |
| 2009/0006368 | A1 | 1/2009 | Mei et al. | |
| 2009/0158342 | A1 | 6/2009 | Mercer et al. | |
| 2010/0076991 | A1 | 3/2010 | Nakano et al. | |

(Continued)

FOREIGN PATENT DOCUMENTS

| JP | 2008-193431 | 8/2008 |
| WO | WO2013001071 | 1/2013 |

OTHER PUBLICATIONS

World Intellectual Property Organization, Application No. PCT/US15/42547, International Search Report dated Oct. 12, 2015.

(Continued)

*Primary Examiner* — Sana A Al- Hashemi
(74) *Attorney, Agent, or Firm* — Wong & Rees LLP; Kirk D. Wong

(57) ABSTRACT

Creating a playlist of multimedia assets based on estimated user viewing length and an estimated length of engagement during a user session. Assets are selected based on an anchor asset displayed with the playlist of multimedia assets.

20 Claims, 26 Drawing Sheets

Transformation of Information into Recommendations

Computation of the User-to-Asset Component of Similarity

(56) References Cited

U.S. PATENT DOCUMENTS

| | | | |
|---|---|---|---|
| 2010/0169331 | A1 | 7/2010 | Karidi et al. |
| 2011/0072448 | A1 | 3/2011 | Stiers et al. |
| 2011/0173054 | A1 | 7/2011 | Kutaragi et al. |
| 2011/0202961 | A1 | 8/2011 | Asano |
| 2011/0320380 | A1 | 12/2011 | Zahn et al. |
| 2011/0320437 | A1 | 12/2011 | Kim et al. |
| 2012/0151511 | A1* | 6/2012 | Bernard ............. H04N 21/4826 725/10 |
| 2013/0216200 | A1* | 8/2013 | Howett .................. G11B 27/34 386/E9.011 |
| 2014/0095320 | A1 | 4/2014 | Sivaramakrishnan et al. |
| 2014/0344061 | A1 | 11/2014 | Choi et al. |
| 2015/0310488 | A1* | 10/2015 | Hess ....................... H04L 67/00 705/14.55 |
| 2016/0027057 | A1 | 1/2016 | Sullivan et al. |
| 2016/0277244 | A1 | 9/2016 | Reichert, Jr. |
| 2016/0345062 | A1 | 11/2016 | Klappert et al. |
| 2017/0235848 | A1* | 8/2017 | Van Dusen .............. G06N 5/02 705/12 |
| 2019/0026920 | A1* | 1/2019 | Yi ........................... G06T 7/248 |
| 2020/0097840 | A1* | 3/2020 | Burns ..................... H04L 65/60 |

OTHER PUBLICATIONS

World Intellectual Property Organization, Application No. PCT/US15/42547, Pending Claims as of Oct. 12, 2015.

World Intellectual Property Organization, Application No. PCT/US15/00079, International Search Report dated Nov. 19, 2015.

World Intellectual Property Organization, Application No. PCT/US15/00079, Pending Claims as of Nov. 19, 2015.

European Patent Office, Application No. 15826878.9, Extended European Search Report dated Jul. 26, 2017.

European Patent Office, Application No. 15826878.9, Pending Claims as of Jul. 25, 2017.

European Patent Office, Application No. 15747932.0, Foreign Office Action dated Mar. 9, 2017.

European Patent Office, Application No. 15747932.0, Pending Claims as of Mar. 9, 2017.

United States Patent and Trademark Office, U.S. Appl. No. 14/811,803, Non-Final Office Action dated Mar. 15, 2018.

European Patent Office, Application No. 15826878.9, Foreign Office Action dated Dec. 21, 2018.

European Patent Office, Application No. 15747932.0, Summons to Attend Oral Hearings dated Mar. 22, 2019.

United States Patent and Trademark Office, U.S. Appl. No. 14/811,803, Non-Final Office Action dated Nov. 21, 2018.

European Patent Office, Application No. 15747932.0, Foreign Office Action dated Oct. 18, 2018.

United States Patent and Trademark Office, U.S. Appl. No. 14/811,803, Non-Final Office Action dated Aug. 27, 2019.

European Patent Office, Application No. 15826878.9, Summons to Attend Oral Hearings dated Aug. 14, 2020.

Han et al, "Evaluation of User Reputation on YouTube", 12th European Conference on Computer Vision, ECCV 2012; [Lecture Notes in Computer Science], pp. 346-353, XP047541589, ISSN: 0302-9743, ISBN: 978-3-642-36741-0.

United States Patent and Trademark Office, U.S. Appl. No. 14/811,803, Final Office Action dated Apr. 23, 2020.

United States Patent and Trademark Office, U.S. Appl. No. 14/811,803, Non-Final Office Action dated Dec. 15, 2020.

United States Patent and Trademark Office, U.S. Appl. No. 14/811,803, Final Office Action dated Jul. 13, 2021.

Harris, Javacia N., "Headline: Getting in Tune", Courier-Journal: V.15. Louisville, KY.: Gannett Co., Inc. (Jan. 11, 2006) Full Text (Year: 2006).

United States Patent and Trademark Office, U.S. Appl. No. 14/811,803, Non-Final Office Action dated Feb. 9, 2022.

* cited by examiner

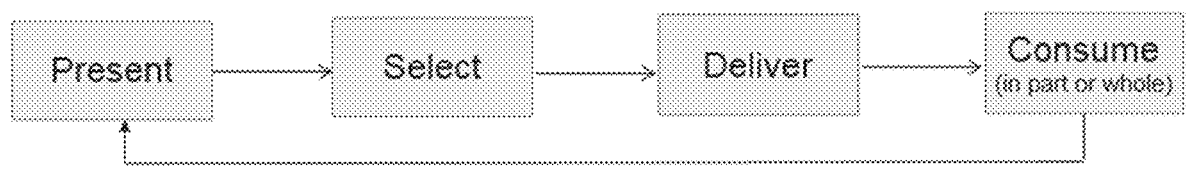
FIG. 1. Asset Consumption Cycle
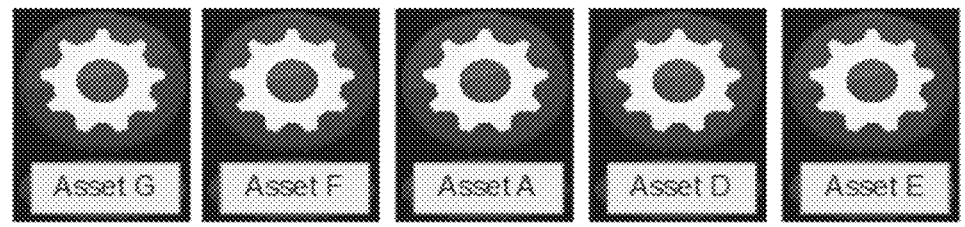
FIG. 2: Example Recommendations

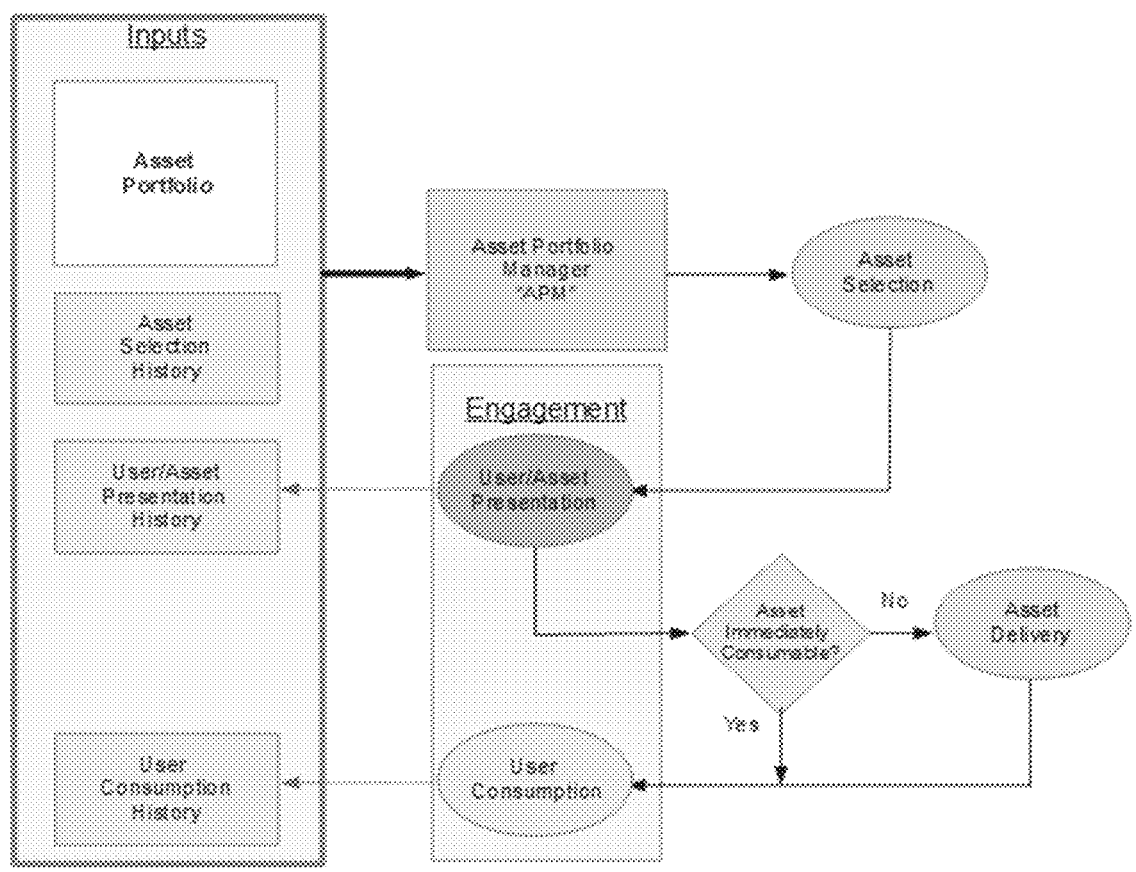
FIG. 3: Recommendation System Information Flow

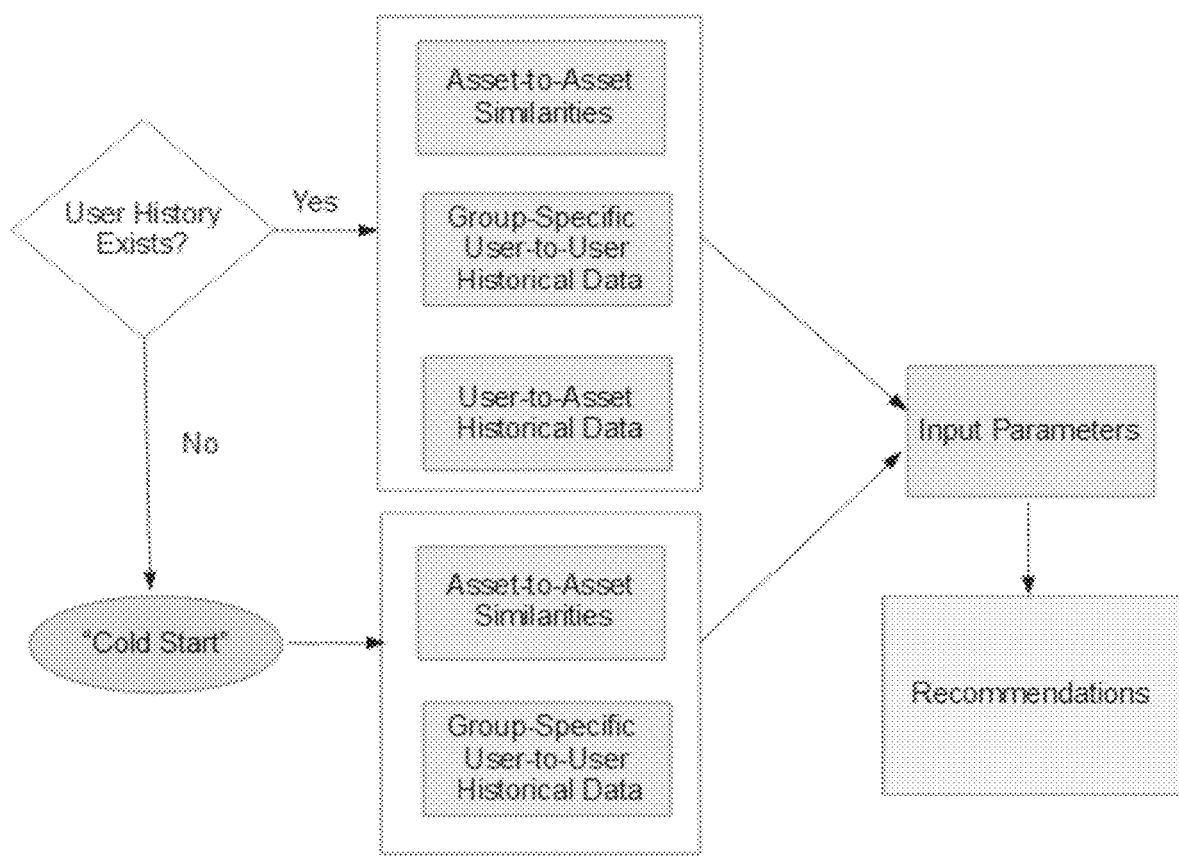
FIG. 4: Transformation of Information into Recommendations

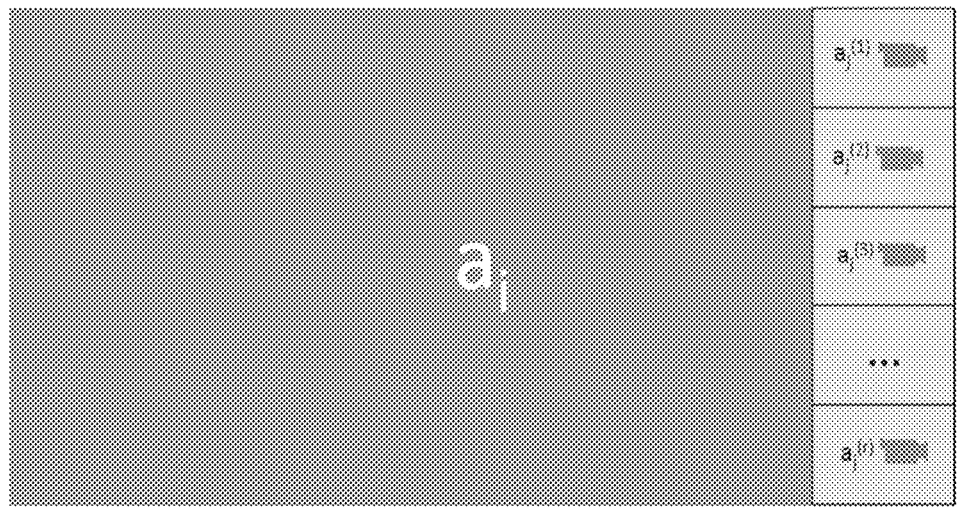
FIG. 5: Example Presentation Constrained by Hardware, Software, and Layout
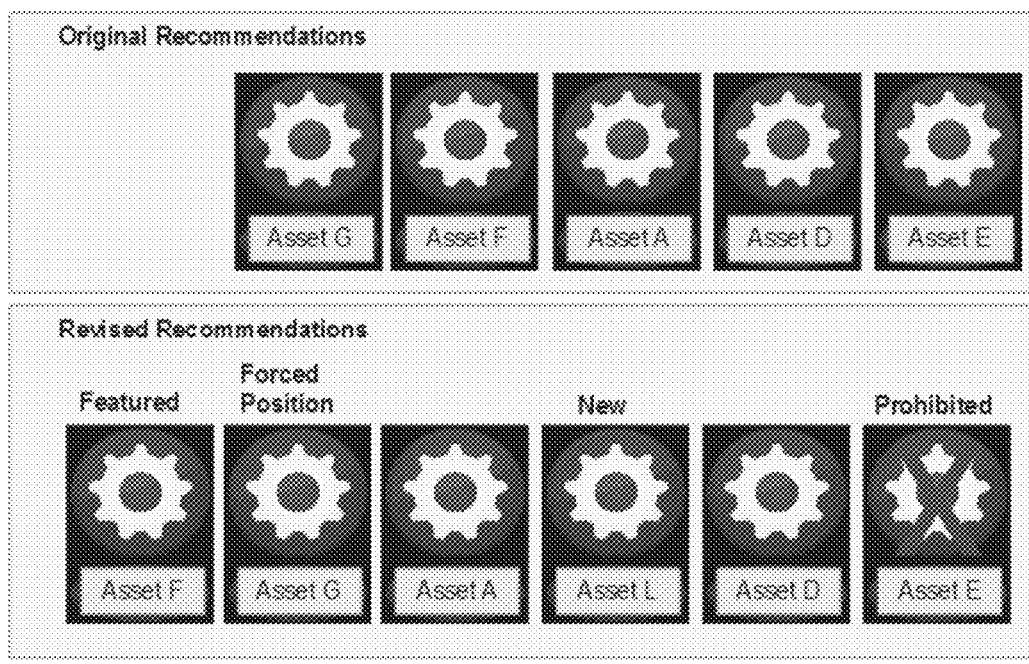
FIG. 6: Revised Recommendations Reflecting APM Specifications

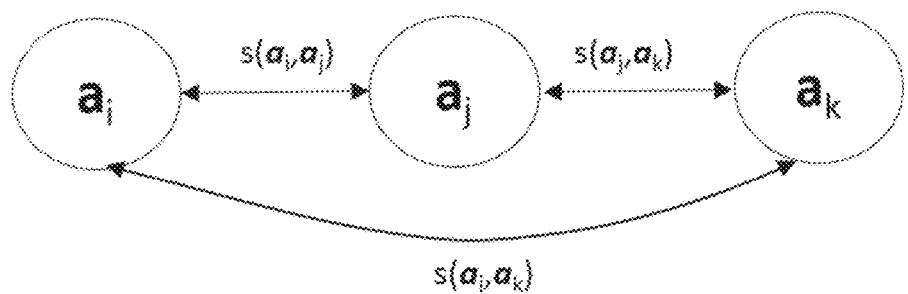
FIG. 7. Pairwise Comparison Example of Three Assets
| Asset | Feature 1 | Feature 2 | Feature 3 |
|---|---|---|---|
| $a_i$ | $x_{i,1} = .50$ | $x_{i,2} = .45$ | $x_{i,3} = .50$ |
| $a_j$ | $x_{j,1} = .60$ | $x_{j,2} = .30$ | $x_{j,3} = .61$ |
| $a_k$ | $x_{k,1} = .10$ | $x_{k,2} = .15$ | $x_{k,3} = .15$ |
FIG. 8. Example Asset Feature Values

| Asset | Pairwise Absolute Differences Among Assets for Feature 1 | | |
|---|---|---|---|
| | $a_i$ | $a_j$ | $a_k$ |
| $a_i$ | $\|x_{i,1} - x_{i,1}\| = \|.50 - .50\| = 0$ | $\|x_{i,1} - x_{j,1}\| = \|.50 - .60\| = .10$ | $\|x_{i,1} - x_{k,1}\| = \|.50 - .10\| = .40$ |
| $a_j$ | $\|x_{j,1} - x_{i,1}\| = \|.60 - .50\| = .10$ | $\|x_{j,1} - x_{j,1}\| = \|.60 - .60\| = 0$ | $\|x_{j,1} - x_{k,1}\| = \|.60 - .10\| = .50$ |
| $a_k$ | $\|x_{k,1} - x_{i,1}\| = \|.10 - .50\| = .40$ | $\|x_{k,1} - x_{j,1}\| = \|.10 - .60\| = .50$ | $\|x_{k,1} - x_{k,1}\| = \|.10 - .10\| = 0$ |

FIG. 9. Absolute Values of Pairwise Differences for Feature 1 in the Example Data

| Asset | Pairwise Absolute Differences Among Assets for Feature 2 | | |
|---|---|---|---|
| | $a_i$ | $a_j$ | $a_k$ |
| $a_i$ | $\|x_{i,2} - x_{i,2}\| = \|.45 - .45\| = 0$ | $\|x_{i,2} - x_{j,2}\| = \|.45 - .30\| = .15$ | $\|x_{i,2} - x_{k,2}\| = \|.45 - .15\| = .30$ |
| $a_j$ | $\|x_{j,2} - x_{i,2}\| = \|.30 - .45\| = .15$ | $\|x_{j,2} - x_{j,2}\| = \|.30 - .30\| = 0$ | $\|x_{j,2} - x_{k,2}\| = \|.30 - .15\| = .15$ |
| $a_k$ | $\|x_{k,2} - x_{i,2}\| = \|.15 - .45\| = .30$ | $\|x_{k,2} - x_{j,2}\| = \|.15 - .30\| = .15$ | $\|x_{k,2} - x_{k,2}\| = \|.15 - .15\| = 0$ |

FIG. 10. Absolute Values of Pairwise Differences for Feature 2 in the Example Data

| Asset | Pairwise Absolute Differences Among Assets for Feature 3 | | |
|---|---|---|---|
| | $a_i$ | $a_j$ | $a_k$ |
| $a_i$ | $\|x_{i,3} - x_{i,3}\| = \|.50 - .50\| = 0$ | $\|x_{i,3} - x_{j,3}\| = \|.50 - .61\| = .11$ | $\|x_{i,3} - x_{k,3}\| = \|.50 - .15\| = .35$ |
| $a_j$ | $\|x_{j,3} - x_{i,3}\| = \|.61 - .50\| = .11$ | $\|x_{j,3} - x_{j,3}\| = \|.61 - .61\| = 0$ | $\|x_{j,3} - x_{k,3}\| = \|.61 - .15\| = .46$ |
| $a_k$ | $\|x_{k,3} - x_{i,3}\| = \|.15 - .50\| = .35$ | $\|x_{k,3} - x_{j,3}\| = \|.15 - .61\| = .46$ | $\|x_{k,3} - x_{k,3}\| = \|.15 - .15\| = 0$ |

FIG. 11. Absolute Values of Pairwise Differences for Feature 3 in the Example Data

| Asset | Composite Differences with weights= {.50, .40, .10} sum of weights= .50+.40+.10 = 1, γ=1 | | |
|---|---|---|---|
| | $a_i$ | $a_j$ | $a_k$ |
| $a_i$ | $.50 \cdot \|x_{i,1} - x_{i,1}\| + .40 \cdot \|x_{i,2} - x_{i,2}\| + .10 \cdot \|x_{i,3} - x_{i,3}\| = (.50 \cdot 0) + (.40 \cdot 0) + (.10 \cdot 0) = 0$ | $.50 \cdot \|x_{i,1} - x_{j,1}\| + .40 \cdot \|x_{i,2} - x_{j,2}\| + .10 \cdot \|x_{i,3} - x_{j,3}\| = (.50 \cdot .10) + (.40 \cdot .15) + (.10 \cdot .11) = .121$ | $.50 \cdot \|x_{i,1} - x_{k,1}\| + .40 \cdot \|x_{i,2} - x_{k,2}\| + .10 \cdot \|x_{i,3} - x_{k,3}\| = (.50 \cdot .40) + (.40 \cdot .30) + (.10 \cdot .35) = .355$ |
| $a_j$ | $.50 \cdot \|x_{j,1} - x_{i,1}\| + .40 \cdot \|x_{j,2} - x_{i,2}\| + .10 \cdot \|x_{j,3} - x_{i,3}\| = (.50 \cdot .10) + (.40 \cdot .15) + (.10 \cdot .11) = .121$ | $.50 \cdot \|x_{j,1} - x_{j,1}\| + .40 \cdot \|x_{j,2} - x_{j,2}\| + .10 \cdot \|x_{j,3} - x_{j,3}\| = (.50 \cdot 0) + (.40 \cdot 0) + (.10 \cdot 0) = 0$ | $.50 \cdot \|x_{j,1} - x_{k,1}\| + .40 \cdot \|x_{j,2} - x_{k,2}\| + .10 \cdot \|x_{j,3} - x_{k,3}\| = (.50 \cdot .50) + (.40 \cdot .15) + (.10 \cdot .46) = .356$ |
| $a_k$ | $.50 \cdot \|x_{k,1} - x_{i,1}\| + .40 \cdot \|x_{k,2} - x_{i,2}\| + .10 \cdot \|x_{k,3} - x_{i,3}\| = (.50 \cdot .40) + (.40 \cdot .30) + (.10 \cdot .35) = .355$ | $.50 \cdot \|x_{k,1} - x_{j,1}\| + .40 \cdot \|x_{k,2} - x_{j,2}\| + .10 \cdot \|x_{k,3} - x_{j,3}\| = (.50 \cdot .50) + (.40 \cdot .15) + (.10 \cdot .46) = .356$ | $.50 \cdot \|x_{k,1} - x_{k,1}\| + .40 \cdot \|x_{k,2} - x_{k,2}\| + .10 \cdot \|x_{k,3} - x_{k,3}\| = (.50 \cdot 0) + (.40 \cdot 0) + (.10 \cdot 0) = 0$ |

FIG. 12. Composite Weighted Differences for the Example Data $$s(a_i, a_i) = 1 - 0 = 0$$
$$s(a_j, a_j) = 1 - 0 = 0$$
$$s(a_k, a_k) = 1 - 0 = 0$$
$$s(a_i, a_j) = s(a_j, a_i) = 1 - .121 = .879$$
$$s(a_i, a_k) = s(a_k, a_i) = 1 - .355 = .645$$
$$s(a_j, a_k) = s(a_k, a_j) = 1 - .356 = .644$$
FIG. 13. Weighted Asset-to-Asset Similarity for Each Pair of Assets in the Example Data
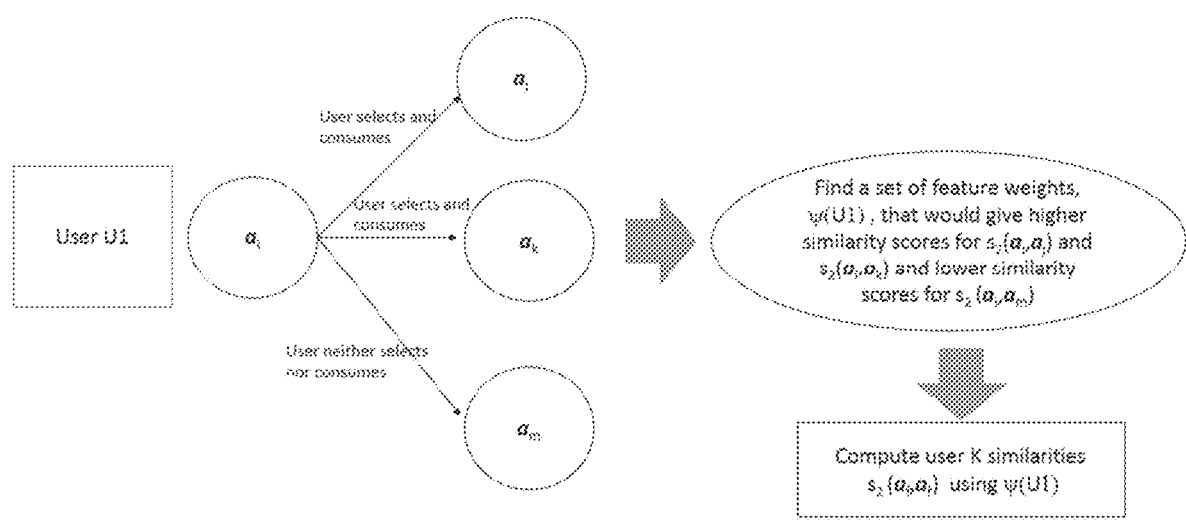
FIG. 14. Computation of the User-to-Asset Component of Similarity

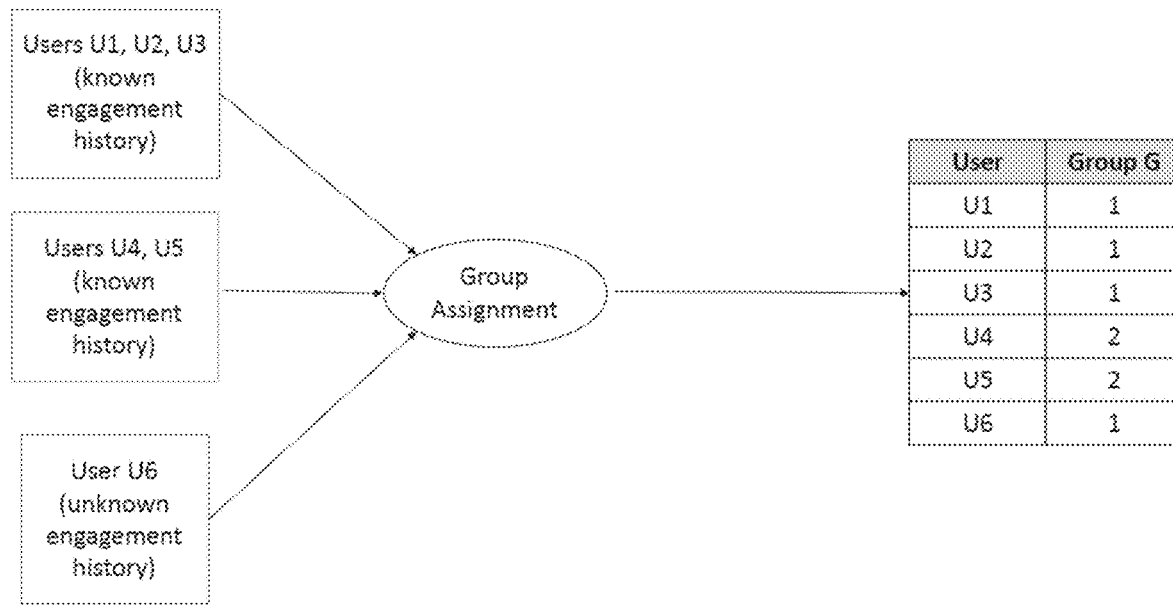
FIG. 15. Group assignment of Users U1-U6
| Group G | User | Historical Consumption of Assets after consuming $a_j$ | | | |
|---|---|---|---|---|---|
| | | $a_j$ | $a_k$ | $a_n$ | $a_u$ |
| 1 | U1 | X | | | |
| 1 | U2 | | X | | |
| 1 | U3 | X | | | |
| 2 | U4 | | | X | |
| 2 | U5 | | | | X |
| 1 | U6 | No History | | | |
FIG. 16. Example of User Historical Consumption of Assets

|  | Average Historical Consumption of Asset after consuming $a_j$ | | | |
|---|---|---|---|---|
| Group G | $a_j$ | $a_k$ | $a_m$ | $a_n$ |
| 1 | 2/3 | 1/3 | 0 | 0 |
| 2 | 0 | 0 | 1/2 | 1/2 |

FIG. 17. Aggregated Behavior by Group Members

|  | Similarities, $s_3$ | | | |
|---|---|---|---|---|
| Group G | $s_3(a_j,a_j)$ | $s_3(a_j,a_k)$ | $s_3(a_j,a_m)$ | $s_3(a_j,a_n)$ |
| 1 | 2/3 | 1/3 | 0 | 0 |
| 2 | 0 | 0 | 1/2 | 1/2 |

FIG. 18. User-to-User Similarities for Example Data

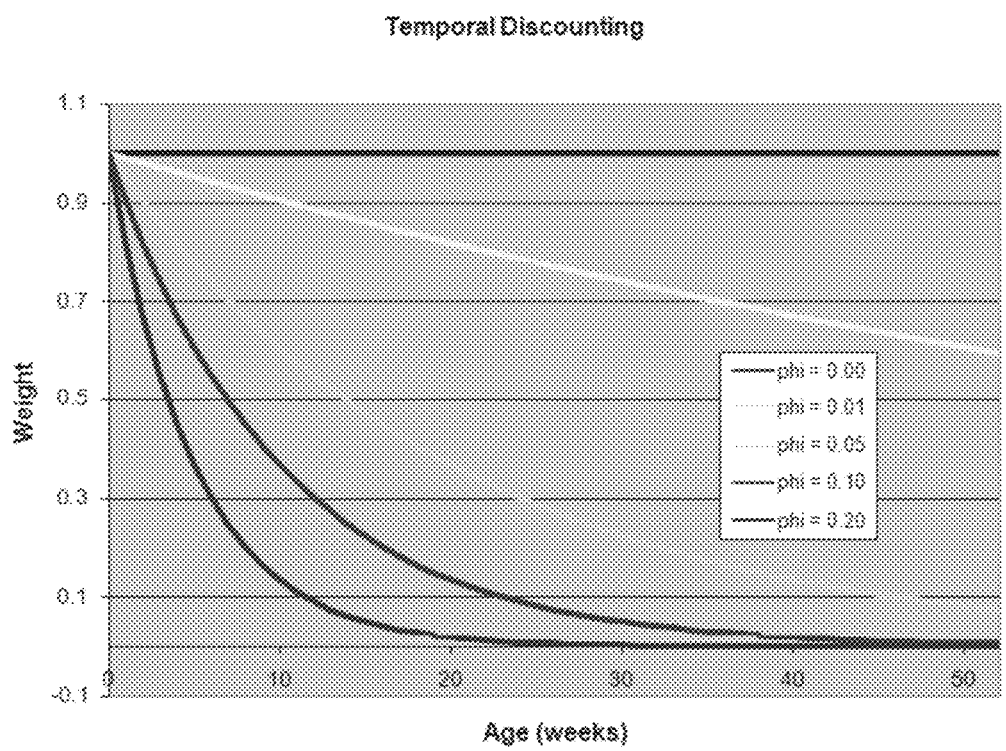
FIG. 19. Temporal Discount Functions
| | Average Historical Consumption of Asset after consuming $a_i$ with the temporal weight of U1's historical consumption of $a_i$ having a weight of 0.5 | | | |
|---|---|---|---|---|
| Group G | $a_j$ | $a_k$ | $a_m$ | $a_n$ |
| 1 | 1.5/2.5 | 1/3 | 0 | 0 |
| 2 | 0 | 0 | 1/2 | 1/2 |
FIG. 20. Weighted User Engagement History

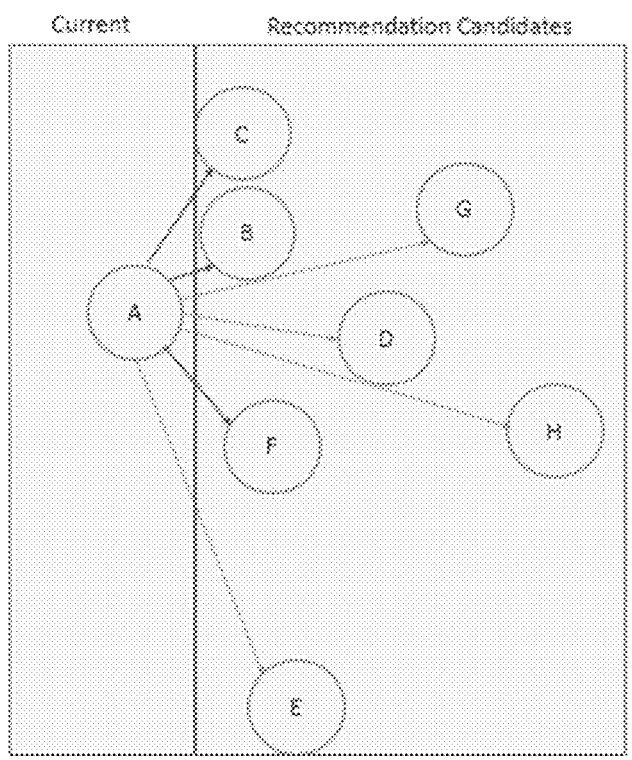
FIG. 21. Depth = 1 Recommendations

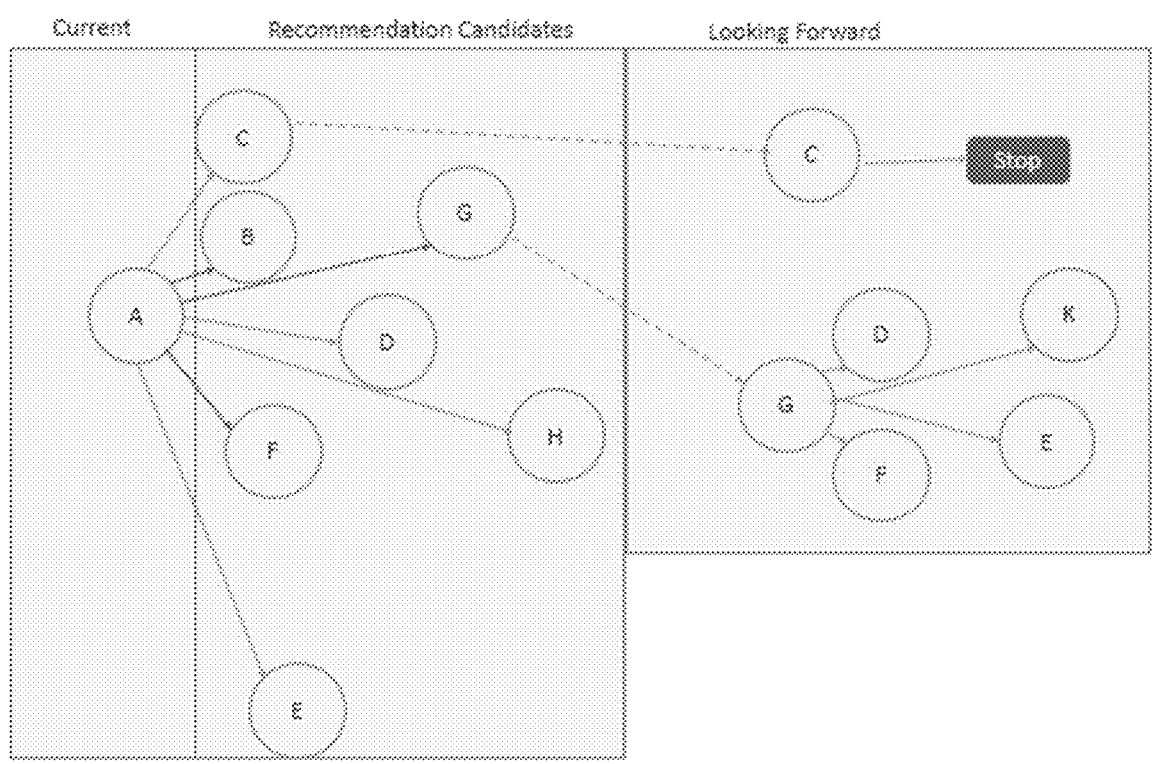
FIG. 22. Depth=2 Recommendations

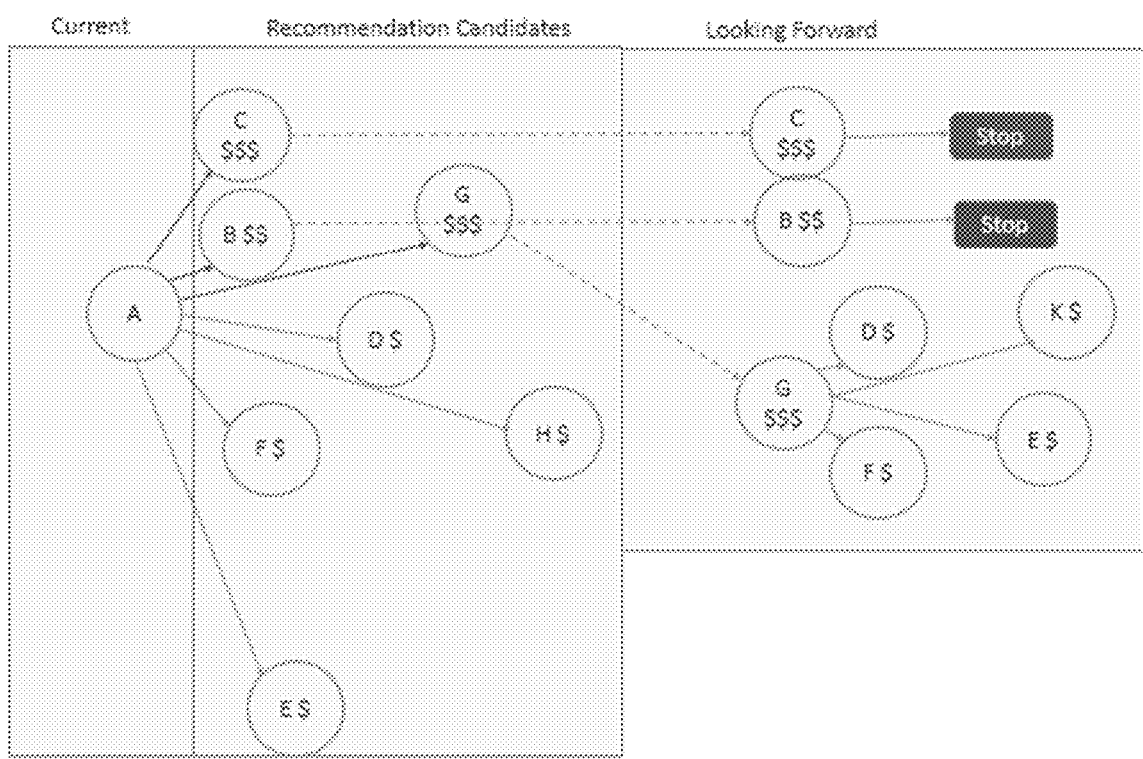
FIG. 23. Depth=2 and Differential Asset Value-Based Recommendations

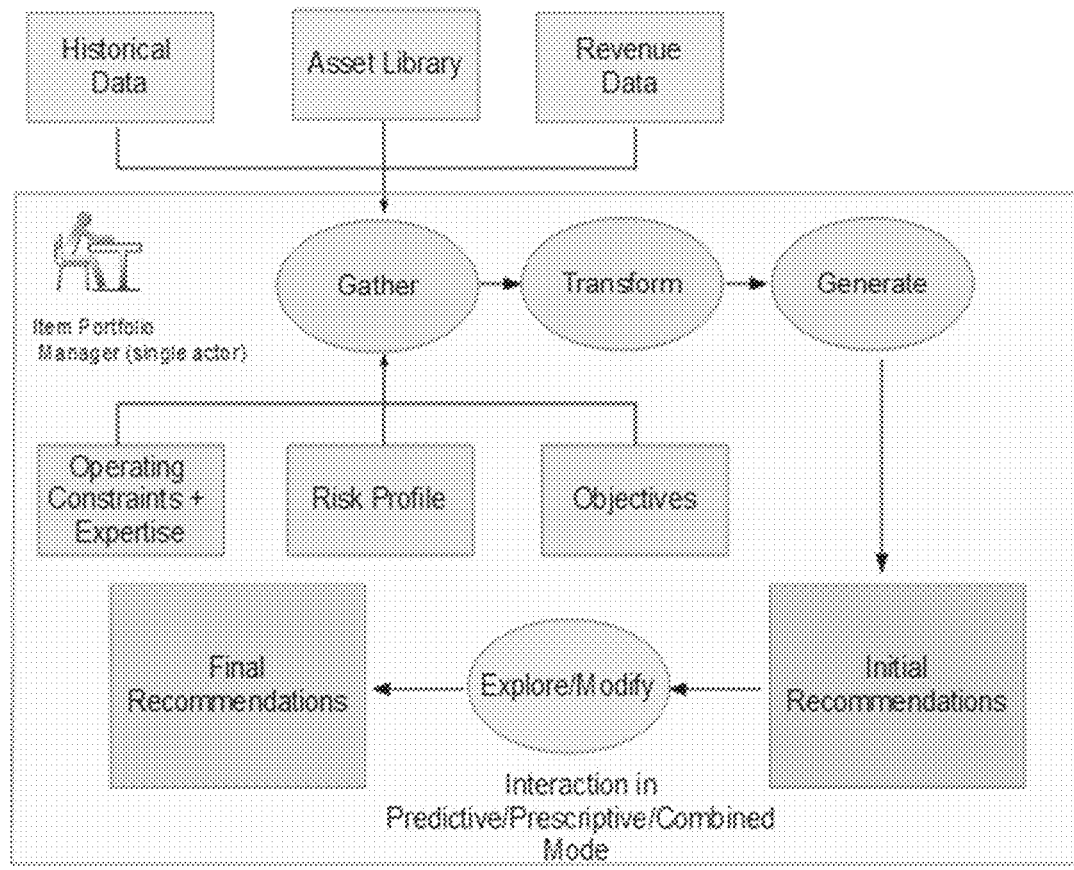
FIG. 24: APM Interaction at a Single Physical Location
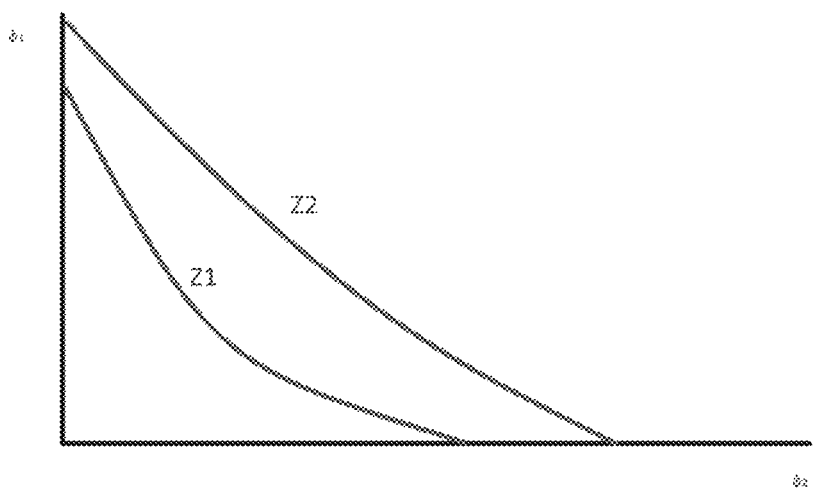
FIG. 25: Solution frontier in prescriptive mode

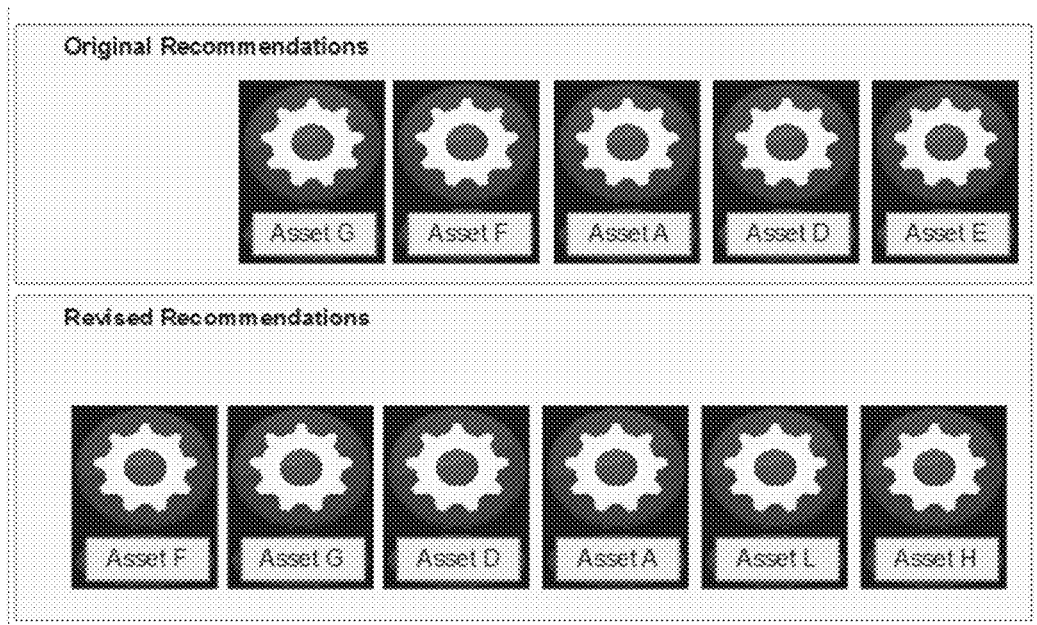
FIG. 26: Re-arrangement of Assets by the APM

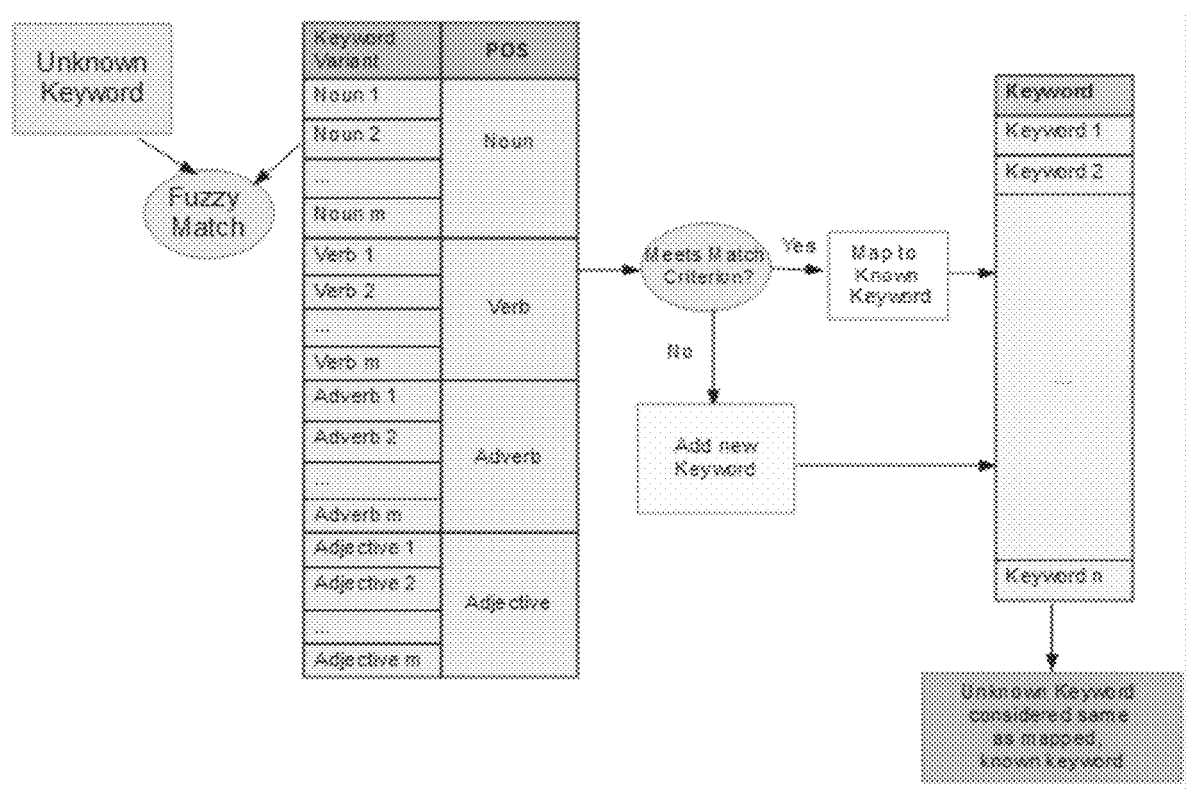
FIG. 28: Mapping an Unknown Keyword

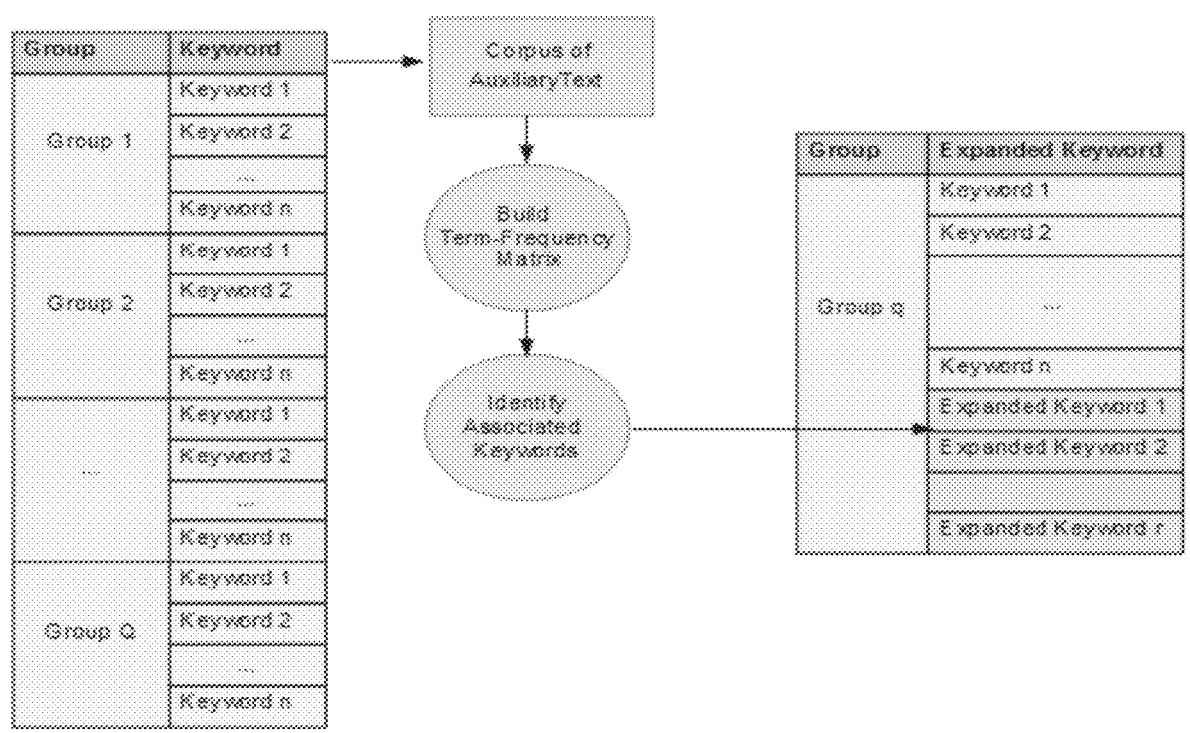
FIG. 29: Keyword Multiplier

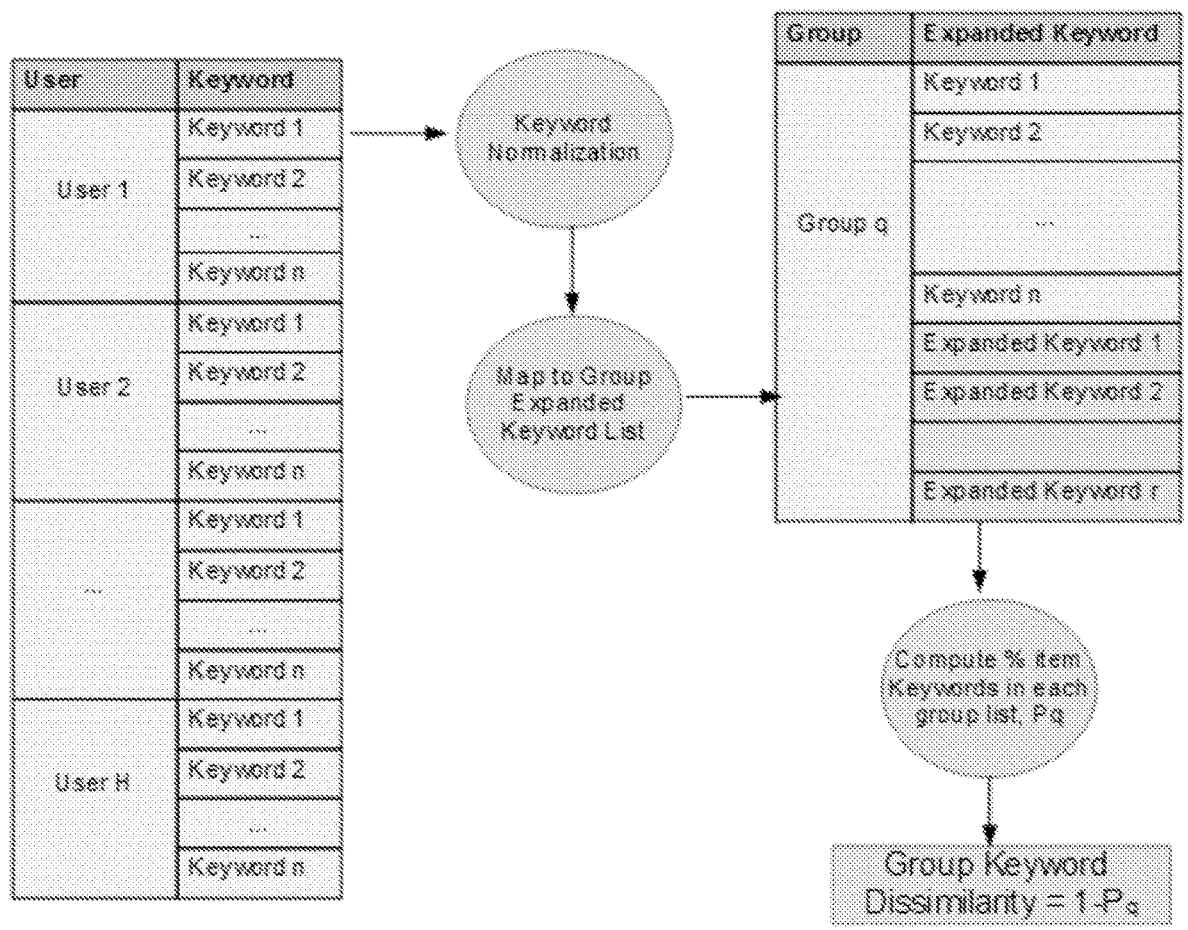
FIG. 30: Keyword Dissimilarity Computation

| Case | Option | Example |
|---|---|---|
| 1 | Anchor asset $a_i$ | |
| 2 | Recommended ordered playlist of assets following $a_i$ | |
| 3 | Continuously-played asset $a_j$ following $a_i$ | |

FIG. 31A. Continuous Play Variants

| | | |
|---|---|---|
| 4 | Continuously-played asset $a_j$ (advertisement) following $a_i$ | |
| 5 | Alternative ordered playlist (non-continuous) following $a_i$ | |

FIG. 31B. Continuous Play Variants

| | | |
|---|---|---|
| 6 | Hybrid ordered playlist (continuous play automatically loads next asset a_j unless user selects a different asset in list) | |

FIG. 31C. Continuous Play Variants

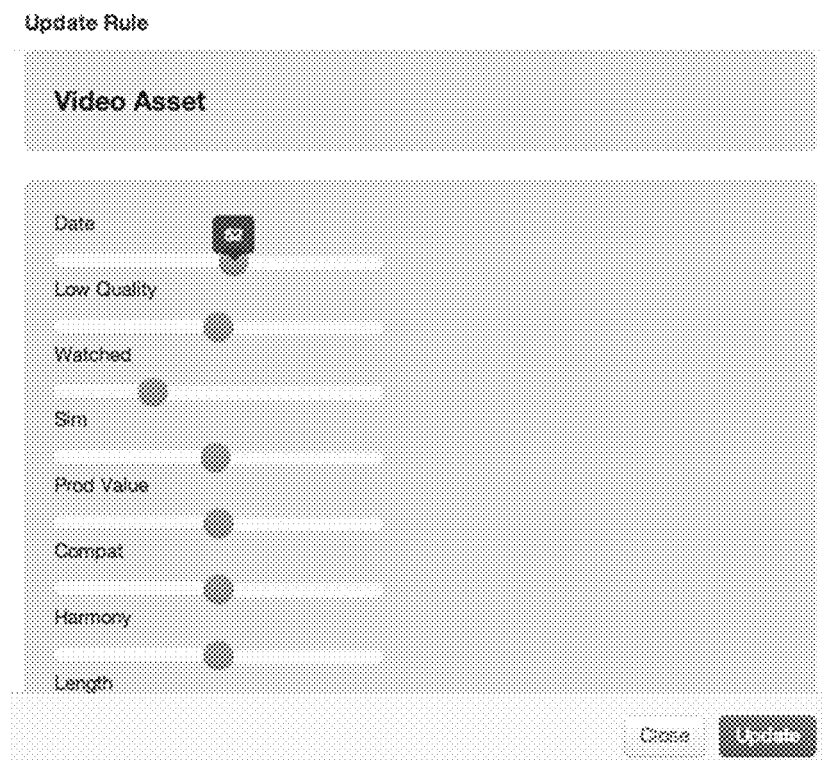
FIG. 32: Screen Capture of an Interactive Display

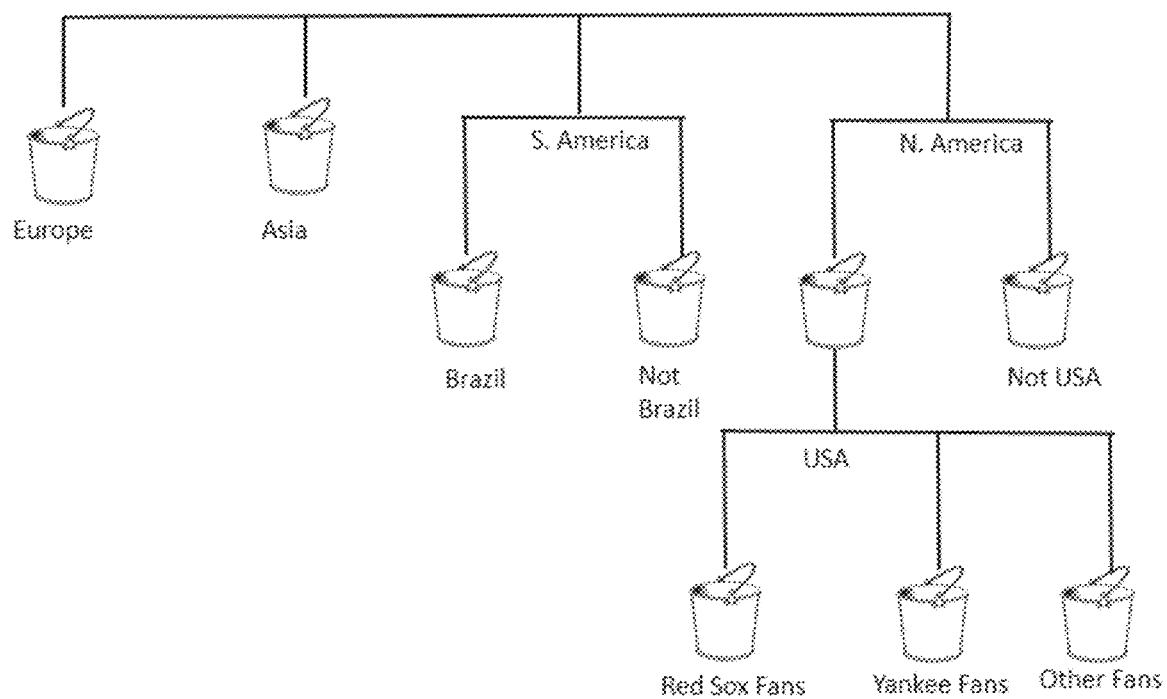
FIG. 34. Example of Group Partitioning Based on Geography and Team Preference Affinity
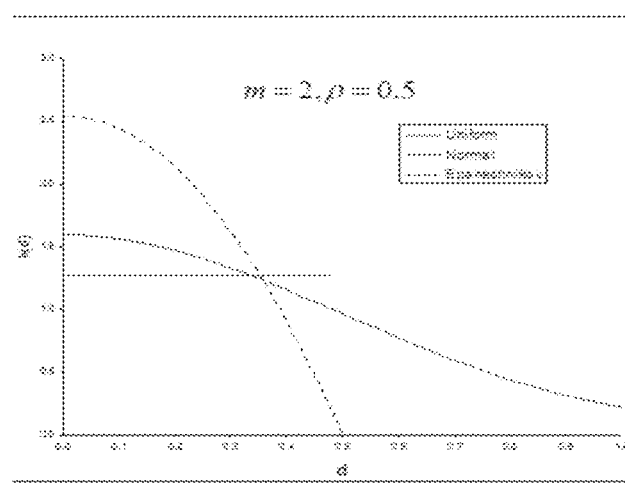
FIG. 35: Example Density Functions

ONLINE ASSET RECOMMENDATION SYSTEM

CROSS-REFERENCE TO RELATED APPLICATIONS; PRIORITY CLAIM

This application claims benefit of Provisional Application No. 62/029,713, filed Jul. 28, 2014, the entire contents of which is incorporated by reference as if fully set forth herein under 35 U.S.C. § 120.

TECHNICAL FIELD

The present disclosure generally relates to the automatic selection of multimedia content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Content suggestion systems traditionally select content based on a relationship to a user's preferences or a relationship to parameters of a search query. Recommendation engines use keyword or tags in order to select content that match a particular content selected by a user. These systems have a singular function that is focused on presenting a set of content that is similar in type, e.g., video, to the content being accessed by the user. Further, these systems typically present the suggested content to the user in a list format. Content providers lack a mechanism for getting assets from their mixed-multimedia asset libraries in front of users and to present the mixed-multimedia assets to users in meaningful and engaging ways.

BRIEF DESCRIPTION OF THE DRAWINGS

In the drawings:

FIG. 1 illustrates an example cycle of assets presentation, selection, delivery, and consumption according to an embodiment of the invention;

FIG. 2 illustrates an example ordered set of recommended assets, according to an embodiment of the invention;

FIG. 3 illustrates a recommendation system information flow block diagram, according to an embodiment of the invention;

FIG. 4 illustrates an example block diagram of an information transformation system, according to an embodiment of the invention;

FIG. 5 illustrates an example presentation user interface, according to an embodiment of the invention;

FIG. 6 illustrates an example revised ordered set of recommended assets, according to an embodiment of the invention;

FIG. 7 illustrates an example of pairwise comparison of assets, according to an embodiment of the invention;

FIG. 8 illustrates an example of feature values for three assets according to an embodiment of the invention;

FIG. 9 illustrates an example of the absolute value of differences of assets for feature 1 of the example data, according to an embodiment of the invention;

FIG. 10 illustrates an example of the absolute value of differences of assets for feature 2 of the example data, according to an embodiment of the invention;

FIG. 11 illustrates an example of the absolute value of differences of assets for feature 3 of the example data, according to an embodiment of the invention:

FIG. 12 illustrates an example of the weighted composite differences of assets for feature 1,2,3 of the example data, according to an embodiment of the invention:

FIG. 13 illustrates an example of the weighted asset-to-asset similarities of each pair of assets in the example data, according to an embodiment of the invention;

FIG. 14 illustrates the process by which the user-to-asset similarities of each pair of assets are computed, according to an embodiment of the invention;

FIG. 15 illustrates an example of the assignment of users to groups, according to an embodiment of the invention;

FIG. 16 illustrates an example of groups members historical engagement behavior, according to an embodiment of the invention;

FIG. 17 illustrates an example of the user-to-user similarity for user U1-U6 in the example, according to an embodiment of the invention;

FIG. 18 illustrates an example of the user-to-user similarity for user U1-U6 in the example, according to an embodiment of the invention:

FIG. 19 illustrates an example graph of temporal discount functions, according to an embodiment of the invention;

FIG. 20 illustrates an example of how the user-to-user similarity may be affected by the temporal weighting, according to an embodiment of the invention;

FIG. 21 illustrates an example recommendations graph, according to an embodiment of the invention;

FIG. 22 illustrates an example recommendations graph, according to an embodiment of the invention;

FIG. 23 illustrates an example differential asset value-based recommendations graph, according to an embodiment of the invention;

FIG. 24 illustrates how a single APM may perform various functions from a fixed point in space, according to an embodiment of the invention;

FIG. 25 illustrates an example prescriptive mode graph solution set, according to an embodiment of the invention;

FIG. 26 illustrates an example rearrangement of assets, according to an embodiment of the invention;

FIG. 28 illustrates an example mapping an unknown keyword graph, according to an embodiment of the invention;

FIG. 29 illustrates an example keyword multiplier diagram, according to an embodiment of the invention;

FIG. 30 illustrates an example keyword dissimilarity computation, according to an embodiment of the invention;

FIGS. 31A-C illustrate an example of several variants of continuous play of an interactive display, according to an embodiment of the invention;

FIG. 32 illustrates an example screen capture of an interactive display, according to an embodiment of the invention;

FIG. 34 illustrates an screen capture of an example partitioning, according to an embodiment of the invention:

FIG. 35 illustrates an example density functions graph, according to an embodiment of the invention.

DETAILED DESCRIPTION

Figure 27:
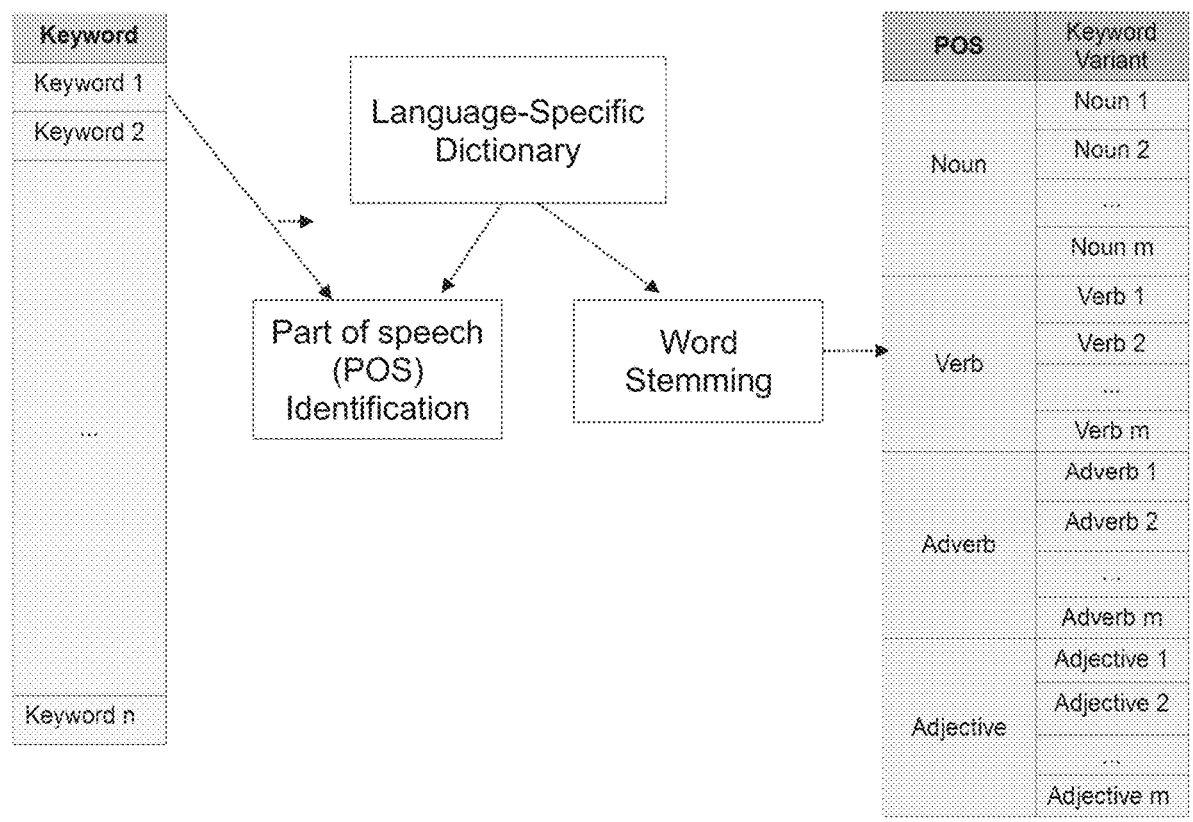
FIG. 27 illustrates an example keyword normalization graph, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Leveraging Observable Information to Shape Recommendations
3.0. The Asset Portfolio Manager as a Single Actor
4.0. Affiliations
5.0. Methodology
6.0. Unconstrained Recommendations
7.0. Improving Recommendations Based on Affiliations
8.0. Continuous Play Video Recommendations
9.0. Asset Portfolio Manager Interaction with Continuous Play Video Recommendations
10.0. Affiliation-based Improvement to Continuous Play Video Recommendations
11.0. Group Membership Assignment
12.0. Implementation Mechanisms—Hardware Overview
13.0. Extensions and Alternatives 1.0. General Overview This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Disclosed herein are systems and method for selection and online presentation of a set of assets to a user based on known similarities among assets and historical behavior collected during user's online engagement with the selected assets. An asset may be any item or product that can be presented or represented (e.g., an item description, photograph of a physical item, sound file, article, blog post, advertisement, etc.) in an online environment. An engagement may be defined as the temporal window in which the user has focused sensory attention on the set of assets containing four components as shown in FIG. 1:

a. Online presentation is the process of physically displaying assets in electronic form using available software and hardware and where the electronic assets displayed may be stored remotely from the display device.
b. Selection is the process associated with a user choosing a specific asset or assets for future consumption.
c. Delivery occurs when the asset is made available for consumptions and would include a tangible transfer of the asset to the user or becomes consumable for online consumption.
d. Consumption of an electronically delivered asset may be immediate and terminates when the end of the electronic file is reached or the user terminates the interaction with the an element of the asset set. If a tangible asset(s) needs to be physically delivered to the user—consumption may begin upon receipt of the asset(s) by the user and terminates when the asset no longer hold intrinsic value.

During an online engagement with a set of specific assets, the various actions conducted by an individual user or plurality of users can be catalogued and leveraged to provide an optimized list of related assets that can jointly increase the total user engagement and maximize a business objective of the organization responsible for managing the asset collection. An embodiment selects assets for display based on an objective of maximizing the revenue that results from engagement (e.g., including the presentation and consumption) of selected assets. A selection may be the process of determining which subset of assets—selected from a portfolio of available assets—will be made available to a user(s). An appropriate selection process is one that results in a presentation of assets that are more likely to be consumed by the user and therefore yields some level of revenue—the resulting selected assets can be referred to as recommended assets. Furthermore, the underlying process for generating recommendations may be referred to as a recommendation system and the computer program that performs an selection of an ordered presentation of assets may be called the recommendation algorithm. The ordered set of recommended assets may be called an ensemble. FIG. 2 depicts an example of an ordered set, a*, of m=5 recommended assets that are selected from the total available portfolio of assets, a (where a*⊆a), for display to a user.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Leveraging Observable Information to Shape Recommendations

There are opportunities to construct a recommendation engine that can be used to help achieve higher levels of revenue by affecting the level and quality of recommendations to users. A recommendation engine constructed for this purpose would require several components in order to provide value to the asset portfolio manager (APM):

1. An understanding of the algorithm used to select and rank assets for display to a user—the mechanics of the algorithm need not be disclosed as long as there exists an optimization capability that APMs can use to explore how various presentations would impact the resulting revenue.
2. An ability for users—in the course of their engagement—to reveal their preferences for the various assets presented to them. The revelation of preferences may be:
   a. directly captured if usable mechanism exists for doing so, or
   b. by inferences drawn from the user's actions during historical engagement experiences.
3. Known or inferred user affiliations that allowing grouping of users.
4. A cumulative aggregation of historical engagement data from similar users that indicate preferred group-specific engagement with specific elements of the asset portfolio. The definition of "similar users" will be discussed in later sections and can be based on various features including demographic information (e.g., age, gender, location, etc.).
5. Rules applied by the APM to account for operational constraints, subject matter expertise, and risk tolerance.

6. A known or estimated amount of supply (the inventory of assets in the portfolio, a) and the relationships among them [asset-to-asset similarities: $s_1(a_i, a_j)$ $a_i,a_j \in a$].
7. The estimated viewing length of each asset and the time window for which the user is likely to be engaged (reported directly by the user or inferred from past behavior).
8. An archive of historical user behavior capturing user-to-user similarities for all previous users, indexed by demographic and behavioral features.
9. The monetary value (both direct and indirect) associated with the user's engagement of each asset during the various discrete temporal window in which the engagement is active.
10. The probability, $p_{j,t+k}$, that any asset, $a^j$ will be consumed in time period t+k by user $y_p$ during an engagement.

Where revenue maximization for the manager of the asset collection is the goal of the optimization and where the features of the asset portfolio are measurable, a hyper-dimensional graph theoretic-based approach may be used to exploit historical data to generate a set of recommended assets in the portfolio for which the user seeks to engage. In the graph-based framework, revenue-generation decisions can project the probabilities of engagement for each assets over the entire engagement window for an unlimited number of conditional decisions that will presented in the remaining, constrained engagement time window. At each anticipated point in the user's decision cycle (defined as the total period in which the user makes choices about the assets to be engaged and engages the assets), t, the APM may present recommendations based on predicted user response—these predictions would take into account all available information that would be available at the time of the decision prior to the presentation, t|t-δ (the decision time t conditioned upon knowledge available at time period t-δ δ≥0). Since the future actions of the user (for k>0) are not known at time t+k (k≥0), the revenue-maximization objective is more appropriately considered an expected revenue-maximization. The objective function for selecting recommendations to a single user at time l given an asset portfolio containing n' assets, $a^{(l)} \subseteq (a_1, a_2, \ldots, a_{n'})$, may then may be expressed as:

$$\text{maximize } E_t(Z) = v_0 + \sum_{k=1}^{K} p_{j,t+k} \times f(\pi_{i,t+k}) \times (v_{j,t+k} + e_{j,t+k}) \quad \text{[Equation 1]}$$

where:
$p_{j,t+k}$ is the joint probability that asset $a_j$ will be engaged at time t+k based on information made available in prior periods, t-δ(δ>0), and so $$p_{j,t+k} = \prod_{\delta=1}^{t-1} \phi_{j,t-\delta}$$

where $\phi_{j,t-\delta}$ are the individual probabilities of selection in prior periods of the same engagement At time period k=( ): $p_{j,t+k} = p_{j,t} = p_{i,t}$ $v_o$ is the direct, fixed revenue associated with future asset engagements $\pi_{i,j+k}$ is the percentage of the asset viewing length consumed by the user in time t+k $f(\pi_{i,j+k})$ is a function representing the accumulation of revenue during the engagement and consumption of asset $a_j$ in period t+k that can be uniform or represent discrete accumulation of certain temporal thresholds that yield revenue $v_{j,t+k}$ is the direct revenue associated with asset $a_j$ if consumed in full by the user $e_{j,t+k}$ is the indirect revenue associated with the asset $a_j$ based on the information its selection and engagement add to the business analytics function.

As the quality of information in the δ=1, ..., Δ periods may degrade as time lag grows, a temporal degrade function can be used to devalue the relevance of each information collected during the historical data period. Though the degrade function may be selected based on machine-learning (ML) algorithms, a priori subject matter expertise, or other factors, construction of the degrade function can be based on minimum allowable confidence level that the APM may wish to achieve in order to reduce the risk of their expected revenue predictions.

The computation of the joint probability $p_{j,t+k}$ that asset $a_j$ will be chosen for consumption at time t+k based on information made available in prior periods has four distinct components, each representing information gained from a historical database of user behavior for an individual user $y_p$, the plurality of all P user who have historically engaged recommended assets $y=(y_1, y_2, \ldots, y_p)$ and measurable features for each asset $a_i$ in the portfolio of n assets;
1. Asset-to-asset: a component representing the similarity of each pair of assets $s_1(a_i, a_j)$ that is independent of the user base and based only on the assets themselves. In this type of similarity comparison, $a_i$ is the asset currently being engaged (or the last asset consumed by the user in prior engagements if this is the first decision step in the current engagement) and $a_j$ is any other asset not consumed in prior engagements $a_j \in a^{(t)}$ where $a^{(-t)}$ are the assets consumed in prior engagements and $a^{(t)} = a \cap a^{(-t)}$.
2. User-to-Asset: a component representing the historical frequency in which the distinct user selected asset $a_j$ after consuming asset at during engagements when $a_j \in a^{(t)}$ for the set of users in the historical engagement data set,
3. User-to-User: a component representing the historical frequency in which other users next selected asset $a_j$ after consuming asset $a_i$ during engagements when $a_j \in a^{(t)}$ for the set of users in the historical engagement data set. An important point is that the user-to-user component includes only the historical behavior of individuals having similar asset demographic features, affiliations and preference. If $G_q$ is a group containing one or more members determined to have similar demographic features, affiliations and preferences, then every user $y_p$ holds membership in one or more of the q=1, ... Q groups ($y_p \in G_q$) and the plurality of groups is $G=\{G_1, G_2, \ldots, G_Q\}$. When the number of observations in the group is too small to base historical inferences, the history of large sets (perhaps those belonging to cluster of historical users groups $G' \subseteq G$ sharing fewer similarities than the members of set $G_q$ to which the user belongs).
4. Parameter set, $\theta_q$: a vector of inputs indicating;
 how the above three distinct components should be linearly combined to determined the overall probability of consumption $p_{j,t+k}$ at time t for user $y_p$.
 set of weights, $w_1$, indicating how much relative importance each of the asset's structural features should have when computing the asset-to-asset similarities.

3.0. The Asset Portfolio Manager as a Single Actor

In an embodiment, the entire process of generating recommendations may be accomplished by a single actor—the "asset portfolio manager" (or "APM")—who, while remaining in a fixed location, can access all data, algorithms and generate the recommendations that are made available to user engaging the asset(s) selected from the portfolio. The role of the APM may be filled by the owner of the collection or another party given authorization to generate recommendations and pursue revenue acquisition on behalf of the owner of the portfolio. FIG. 3 depicts the flow of information that is managed by the APM and encompasses asset selection, user engagement, and the storage and leveraging of recorded historical interactions with the recommendation algorithm and the asset portfolio.

4.0 Affiliations

During an online engagement where a recommendation system presents an ordered list of assets available for engagement, the algorithm's output may reflect a distinct set of assets selected to appeal to a group of users—though allowing user-specific information to bear some influence in the selection process. An individual user may be a sole member of a group, but it is often more computationally efficient to assign multiple users to a single group and provide recommendations partially shaped to appeal to each member of that group using a common set of algorithmic inputs. In a specific case, where the user-specific behavior is no different from all other members of the same group or when there is no historical engagement data for the user, the storage of recommendations can then be reduced from one set for every user $y_p$ (p=1, . . . , P) to one set for every group $G_q$ (q=1, . . . , Q, Q≤P). After a group member starts to generate behavior that distinguishes it from the other users in the same group, the user-to-asset component of the probability of consumption will begin to shape the user-specific recommendations. This is often the case in a "cold start" scenario where an individual user initiates their first engagement session—in such cases, the user-to-user, group specific historical behavior can be used as a substitute—the implicit assumption is that the user preferences will be similar to others in the group for which engagement history data does exist. FIG. 4 illustrates how the various components are combined to generate recommendations depending on whether user-specific historical information is available to shape the selection.

The purpose is to improve the quality and accuracy of recommendations by leveraging the known preferences of each group—the information known about distinct groups of users can be better aligned with assets that are consistent with their consumption requirements yielding an increased chance the presented assets will be selected and consumed. When the partitioning of users into groups is performed, then the characteristics and preferences in each group can be matched with assets that may appeal that that specific group rather than the entire population of user. Ideally, a partitioning of the entire user population—or further partitioning of an identified group partition—should occur only if there the operation will have positive impact on the net result of the subsequent recommendations. The APM—the entity responsible for managing the recommendations—will have a known expected revenue maximization objective function. $E_t(Z)$, in mind when he/she activates the recommendation algorithm at time t. An example of the value of an objective function for a set of recommendation presented to a member of an individual group, $G_q$, would be $E_t(Z; s(a_i, a_j), y_p, \theta_q)$ representing the asset-to-asset similarities, the group-specific user-to-user historical behavior, the user-specific historical behavior, and the input parameters. In this notation. R is a set of recommended assets selected from a portfolio of assets. A, that results from $X_q$ (a matrix of observed input data that guides the recommendations for group q), $\Theta_q$ (a vector input parameters for group q), and f( ) is the function that transforms the input data and parameters into a distinct metric that reflects the recommendations generated using specific values of $X_q$, $\Theta_q$. A reflects the known constraints. The simple point is that partitioning the total set of users, Y, into subsets. $G_q$ (q=1 . . . Q) and presenting recommendations partially-based on observed group-specific behavior can be performed in order to pursue a more favorable value of the objective function.

The challenges associated with partitioning users into distinct groups are discussed herein and include a multi-step process which can be accomplished by a single actor (the APM, for example), at a single location. These steps are:

1) Partitioning Users into Non-overlapping sets: Assigning users to groups based on observed or inferred features. This can be accomplished in three sub-steps:
   e. Identifying user characteristics (more commonly called features in the machine learning and pattern recognition fields) that are used to determine group membership. These features may be directly observable (for example, the user's gender, age, location, etc.) or may be inferred by analyzing the historical behavior of users interaction with recommended assets (for example, i) the user may only engage the recommended asset list at certain times of the day, week or month, or ii) the user may reveal through online engagements that he/she is only interested in particular categories of assets).
   f. Identifying known groups
   g. Using a classifier to assign each user to a known group based on an examination of its features and compared with the features of other member in each group.

The mechanics of group assignment is detailed below.

2) Group-Item Affiliations: Identifying meta-data in assets available to the recommendation and that suggest that the members of a user group might prefer certain assets possessing the appropriate characteristics.

3) Bias Identification: A common problem in extracting preferences from a user group is that [individuals with strong affinities for an asset or set of assets interact with a recommendation system in a way that is subject to cognitive bias. These biases would most commonly result from feedback given using interactive ratings that allow the user to assign a score to assets presented and/or consumed such as a multi-star rating system (for example, rate the asset based on a scale of 1-to-5 stars) or a "like" or "dislike" button. Bias identification allows the recommendation algorithm to isolate biased feedback (for example, the user gives stronger ratings to a asset having a brand to which they are loyal or the user rates based on the quality of the delivery of the asset rather than the asset itself).

1. Display Constraints

A set of recommended assets selected to achieve the APM's revenue maximization objective might include as many assets as desired and the ability to present any asset type. However, the physical display hardware and software may have limitations that allow only a certain number of assets and/or asset types (e.g. electronic files that require an embedded software that allows it to be consumed) and may have a specified template or layout desigmt that restricts the physical space available for presentation. FIG. 5 illustrates an example restricted layout for presentation of electronic videos—for a specified asset $a_i$, the layout requires that it be displayed in a main window, and n'−1 (limited by the display area) related assets $\{a_j^{(1)}, a_j^{(2)}, a_j^{(3)} \ldots, a_j^{(n'-1)}\}$ are presented in a sidebar. Note that there are a total of n' displayed assets: the initial "anchor" asset, $a_i$ and the n'−1 related assets.

If $\xi$ is a set of available file types that may be presented in the display given the hardware and software limitation of the display at time t, the set of display constraints is;

$$\lambda_d = \{n', x, \}.$$

2. User Constraints

During an online engagement where a recommendation system presents an ordered list of assets available for consumption, user $y_p$ (p=1, ..., P) is may have a finite tolerance for engagement and may have indicated (directly or through inferred historical actions) that certain assets should not be included in the recommendation set. The two types of user constraints are, therefore;
- the time available for the user to remain engaged (during presentation and consumption of assets);
  $\tau_j$ is the engagement length of asset $a_j$
  T is the total available engagement time for the user take over all selected assets.
- the finite list of assets available for presentation;
  $a^{(t+k)}$ is the set of portfolio assets available for selection at time t+k among n assets in the overall portfolio a the overall set of user constraints for user $y_p$ (p=1, ..., P) is then;

$$\lambda_p = \{\tau_j, T, a^{(t+k)}\}.$$

3. Asset Portfolio Manager Constraints

During an online engagement where a recommendation system presents an ordered list of assets available for engagement, the algorithm may initially fail to reflect the unique business environment in which the APM operation and the manager's subject matter expertise, may not reflect the risk tolerance acceptable the portfolio manager, or may fail to allow temporary deviations from the algorithm's optimization processes given the value of the input parameters that control the flow machine-driven decision-making. The ability to allow an APM to directly modify the output of a recommendation engine to reflect known business rules, subject matter expertise, and risk tolerance levels is a core capability allowed by this application. The asset portfolio need not have any understanding of how the recommendation system algorithms work, only that they have the ability—through a simple interface—to influence the outcomes of the recommendation to ensure they reflect known information not inferred by the engine, take into account the risk aversion preference held by the portfolio manager, and comply with known operational constraints.

a. The APM has subject matter expertise that he/she believes to be more accurate than those used in the default application of the algorithm b. As many search algorithms used to optimize input parameters in a machine-driven method are computationally expensive, the portfolio manager may accelerate the convergence by populating with initial values that reflect his/her knowledge c. Certain recommendation solutions may be disallowed by the business environment such as the rule that no more than n assets be shown or that certain assets may not be displayed to some users (for example, some assets are prohibited by law for sale in certain jurisdictions)

d. The portfolio manager may decide to force the inclusion of certain assets even if the final objective is not optimized in an unrestricted sense—rather the recommendation algorithm will be forces to search for the optimal solution given the applied constraint (e.g. the inclusion of an individual or set of assets)

e. The portfolio manager wished to apply a specific level of risk tolerance. For example, it can constrain the list of recommendations to yield an expected revenue of $\$\kappa$ with a range, given the uncertainty that the user will actually consume the recommended assets, by +/−ρ %. The constraints imposed by the APM are then;

$\sigma_t^2(Z)$ is the maximum allowable variance associated with the computed expected revenue $E_t(Z)$ at time t.

Additionally, the APM may set some constraints that reflect their subject matter expertise, business rules, or known operational constraints in one of the following styles;

- limits—for example, select $m \subseteq n' \subseteq n$ assets to be recommended or select m assets having a per-unit direct revenue of at least $\$\kappa$.
- cases—for example, select n' assets if the end user is located in administrative area U, and select $m \neq n'$ assets if the end user is located in administrative are V.
- linear or non-linear combinations—for example, compute the value of set of n' recommendations by multiplying the unit revenue of each asset, $c_i$, by $\phi$ or by $\phi^2$ and sum them together, Value=$\phi C_1 + \phi C_2 + \ldots + \phi C_{n'}$ using a vector of cost values c=$\{c_1, c_2, \ldots, c_{n'}\}$ and multipliers $\phi = \{\phi_1, \phi_2, \ldots, \phi_{n'}\}$
- initialization: set $a_i$ to be the "anchor asset" that is the presented in the start of an engagement, when t=1.
- restrictive sets—only allow recommendation solutions where the uncertainty surrounding the computed objective function is +/−ρ % or ensure that the final recommendation set includes asset $a_i$ or not include $a_i(a'^* = a^* \cap a_i)$. Three examples where restrictions may apply are:
  - there is a specific asset in the portfolio that is required to be shown—perhaps in a particular position
  - there is a 'featured asset' in the portfolio that is required to be shown in the first position
  - an asset may be removed from the recommendation list because its display is prohibited by law or may be considered offensive to the user.

FIG. 6 shows an example of how these restrictions may affect the online presentation of the recommended items.

Permissive reordering—Allows the APM to reorder asset set without addition, deletion, or substition of recommended assets.

Any combinations of the above

This set of constraints used in these examples comprise the input parameter values that can be understood by the recommendation algorithm and can be passed as variables by the APM:

$$\lambda_{APM} = \{\sigma_t^2(Z), m, n', \kappa, c, \phi, a_i, a'^*\}.$$

Overall, the complete set of constraints may then be expressed as:

$$\Lambda = \{\lambda_d, \lambda_p, \lambda_{APM}\}.$$

5.0 Methodology

In an embodiment, the methodology has seven interrelated components:

1. The mechanics of the data collection and transformation of user-to-user, user-to-asset, asset-to-asset and other demographic and historical data used to generate probabilities of consumption of each asset at the various particular decision points that arise during user engagements 2. The algorithm used to select and choose the display order of asset recommendations during user engagement.
3. A capability to manage the risk associated with the forecasted revenue stream associated with a single user engagement and across all user engagements.
4. An ability to leverage historical user information to increase the revenue derived from dormant assets.
5. An ability to add various constraints to the pursuit of revenue maximization based on inputs from the APM, the user, and the physical limitations of the display device that is use to engage the user.
6. A method for assigning individual users to one or more groups in order to improve the quality of recommendations
7. A method of improving recommendations based on known affiliation of users assigned to each group by leveraging known biases and keyword meta-data.

In an embodiment, under a so-called "supply-side platform" (SSP) regime where the agency managing the asset portfolio is granted a per-unit and/or per-engagement feed for managing the portfolio, providing recommendations, serving advertisements, and providing market intelligence to asset owners. This distinction is important as the display and sorting algorithm is assumed to be based on an objective of maximizing the revenue determined by the SSP—the asset portfolio manager may be pursuing either a maximization of revenue for the SSP or the library owner (who also may be the same entity). Though the two values am often highly positively correlated—the resulting recommendations may differ depending on the entity whose revenue is being considered by the APM.

6.0. Unconstrained Recommendations

In an embodiment, the system generates a set of recommendations for a user, $v_i$, assuming that group membership ($y_i \in G_q$) is known and that no constraints exists. A full description of how the group assignments are made is discussed below. Display, APM, and user constraints are discussed below and how the presence of the constraints influences the selection of recommended assets.

1. Initialization of the display at time t=1, (when no engagement history exists; d=0)

At the initial engagement, when t=1, δ=1, there is a need to define an "anchor asset" $a_i$ against which similar assets are paired and presented in the ordered list of recommendations. The choice of the anchor asset $a_i$ is determined by one of the following methods;

α. an online search for assets using a generalized search engine (e.g. Google, Yahoo, Bing, etc.) may lead to the user conducting the search to thee specific asset, β. An internal search on the page maintained by the APM may result in $a_i$ being selected, χ. If a mechanism exists for implanting a user "cookie" on the display site maintained by the APM, it may be able to capture a history of recent engagements and populate $a_i$ with the last asset visited in the most recent engagement for user $y_p$, or the most similar asset to $a_i$ which would maximize expected revenue in the current engagement given that $a_i$ has already been presented and/or consumed, δ. A "featured" asset may be set by the APM based on a desire to promote an asset to the first position of the display.

ε. Based on knowledge of the group $G_q$ to which the user belongs, a representative asset may be selected for a "cold start" (when no user history exists), or a desire to initialize all new engagements with a user based upon his/her group membership. If a user belongs to more than one group, a decision could be made to select, among all initial assets to be presented to groups in which the user has membership, either the one that will maximize the expected revenue function the one for which the probability of group membership is largest (randomly selecting a group if ties exist).

The rule set for selecting the initial asset $a_i$ can be determined at the discretion of the APM.

2. The mechanics of the data collection and transformation (unconstrained)

The transformation of historical user and group data and asset similarity has three components that may be combined and projected onto a scale over the range [0,1] that represents the probability $p_{j,t}$ that asset $a_j$ will be preferred at decision step t;

if a current engaged user is consuming asset $a_i$ following decisions step t-1, and, has previously consumed (in the current engagement or past engagements) a collection of assets $a^{(-t)}$ prior to time period t.

The computation of probability can first be performed without consideration to the available time remaining in an engagement window, and then only those recommendations meeting that constraint can be assigned a probability $p_{j,t}=0$. The probability has three distinct components, each representing information gained from a historical database of past user behavior and asset features;

a) Asset-to-asset: a component representing the similarity of each pair of assets $s_1(a_i, a_j)$ In this type of similarity comparison, $a_i$ is the asset currently being consumed (or the last asset consumed by the user in prior engagements if this is the first decision step in the current engagement) and $a_j$ is any other asset not consumed in prior engagements $a_j \in a^{(t)}$ where $a^{(t)} A \cap a^{(-t)}$. The similarity between a pair of assets is shown in FIG. 7, reflects a complement to a linear combination of the comparison of the k features of the pair of assets using the Minkowski metric;

$$s_1(a_i, a_j) = 1 - d(a_i, a_j) = 1 - \left[\sum_{m=1}^{k} w_m |x_{i,m} - x_{j,m}|^y\right]^{\frac{1}{y}} \quad \text{[Equation 2]}$$

given that $$w_m, y \geq 0,$$

$$\sum_{m=1}^{k} w_m = 1,$$

where $x_{i,m}$ is the $m^{th}$ feature of asset $a_i$ scaled lie lie in the range [0,1], $w_m$ are the weights assigned to each feature m=1, . . . , k and $|x_{i,m}-x_{j,m}|$ is the numeric representation of difference in the values of k features between asset $a_i$ and $a_j$ Feature values can be nominal, ordinal, categorical, or binary and converted to a numeric scale. In the case of categorical values, the value could be $|x_{i,m}-x_{j,m}|=0$ if $x_{i,m}=x_{j,m}$ and 1 otherwise. FIG. 8, illustrates an example of three assets $\{a_i, a_j, a_k\}$ and the observed k=3 features values for each asset.

This weighted similarity structure (sometimes called a content graph where the nodes are the assets and the arcs between them are represented by the similarities) is used as a tool for identifying and selecting assets based on an established relationship and also provides an objective tool to identify and select similar assets. The Minkowski metric possesses the following properties: 1) Identity: $d_{i,j}=0$; 2) Positivity: $d_{i,j} \geq 0$, where $d_{i,j}=0$ if $x_i=x_j$; 3) Symmetry: $d_{i,j}=d_{j,i}$; 4) Triangle Inequality: $d_{i,j} \leq d_{i,k}+d_{j,k}$ for all i,j,k.

FIG. 9, FIG. 10, and FIG. 11 show the absolute values of pairwise differences among the three assets $\{a_i,a_j,a_k\}$ in the example data for features 1,2,3 respectively. Using an exponent $\gamma=1$ and weights of $w=\{w_1,w_2,w_3\}=\{0.40, 0.30, 0.10\}$ for features 1,2, and 3 respectively, then FIG. 12 shows the composite weighted values of the three features for each pair of assets. From these values, the composite similarities for the example set of assets is shown in FIG. 13.

The Minkowski metric shown above is symmetric, but a directed weighted content graph could easily be substituted if there is a reason viewing asset pairs as asymmetric.

b) User-to-Asset: a component representing the historical frequency in which the distinct users next selected asset $a_j$ after consuming asset $a_i$ during engagements when $a_j \in a^{(t)}$ for the set of users in the historical engagement data set, $s_2(a_i, a_j)$.

In this case, if the pair of assets $a_i$ and $a_j$ have not be presented before to a user, there is no directly observable computation of the user-specific similarity between assets $a_i$ and $a_j$. The goal is to use auxiliary information to infer the similarities based on the user's historical behavior pattern selecting other assets to engage. In this scenario, one might consider using a comparison based on other sequential choice of assets $(a_f, a_g)$ to determine a user-specific Minkowski metric where the various weights, $\psi_m$, reflect the relative importance of the individual features to the particular user. To tune the weights for a particular user, one may build a user-specific classifier that minimizes the misclassification rate on various predicted sequences of historical choices made by the user. $(a_f, a_g)$. To do this, one may vary (over h=1, . . . , H iterations) the vector of feature weights. $\psi_h=\{\psi_{1,h}, \psi_{2,h}, \ldots, \psi_{k,h}\}$ subject to the constraint that $$\sum_{m=1}^{k} \psi_{m,h} = 1.$$

At each iteration, h, a conditional probability $f(a_g|a_f)$ could be computed based on a kernel-weighted density function $K(1-s'(a_f,a_g)|\psi_h)$ to predict the probability that asset $a_g$ is chosen after consuming asset $a_f$. The predicted probabilities could then be compared to the actual choice and the differences $(\theta_t \times [1-p(a_g|a_f)]$ for all pairs $(a_g, a^f)$ where $\theta_t$ is the temporal weight assigned to the observed outcome) averaged over all historical choices to compute a misclassification metric, $C_h$, for iteration h. The resulting set of "optimal" weights would then be $\psi^t=\psi_h$ s.t. min($C_h$). The similarity for the user-to-video choice would then be, given that $\phi_{t-\delta}$ is the weight assigned to the historical observation based on its temporal age, $\delta$;

$$s_2(a_i, a_j) = 1 - d(a_i, a_j) = 1 - \left[ \frac{\phi_{t-\delta} \sum_{m=1}^{k} \psi_{m,h}|x_{i,m}-x_{j,m}|^y}{\sum_{\theta=1}^{i-1} \phi_{t-\delta}} \right]^{\frac{1}{y}} \quad \text{[Equation 3]}$$

$\psi'_{m,h}$, $y \geq 0$, $$\sum_{m=1}^{k} \psi_{m,h} = 1.$$

FIG. 14 depicts how the user-to-asset similarity is computed for an example user (denoted by U1) and the historical consumption for U1 following consumption of an example asset, $a_i$. In FIG. 14, the historical data indicates that, after consuming asset $a_i$, in prior engagements, the user U1 also later consumed assets $a_j$ and $a_k$ but not asset $a_m$. Based on this historical engagement history, it may be inferred that user U1 prefers to consume assets having feature values similar to assets $a_j$ and $a_k$, and has a lesser preference for assets having the feature value of asset $a_m$.

c) User-to-User: a component representing the historical frequency in which other users in the same group, $G_q$, as user ($y_p \in G_q$) next selected asset $a_j$ after consuming asset $a_j$ during engagements when $a_j \in a^{(t)}$ for the set of users in the historical engagement data set. Note that a preferred treatment would be to only consider the historical behavior of users belonging to the same demographic group, $G_q$, as the user being evaluated. FIG. 15, illustrates an example of how 6 users (U1-U6) may be assigned to specific groups; U1, U2, U3, U6 are assigned to group $G_1$ while users U4 and U5 are assigned to group $G_2$. When the number of observations in the demographic-specific set is too small to base inferences, the history of large sets (perhaps those belonging to cluster of historical users G'⊆G sharing fewer similarities than the members of set $G_q$). The similarity in this case would be:

$$s_3(a_i, a_j) = \frac{\sum_{q=1}^{Q} \theta_q \phi_{t-\delta} f_q(a_j \mid a_i, a^{(t-\delta)})}{\sum_{q=1}^{Q} \theta_q \sum_{k=1}^{n} \phi_{t-\delta} f_q(a_k \mid a_i, a^{(t-\delta)})} \quad \forall a_k \in a^{(i)}, \quad \text{[Equation 4]}$$

$i \neq j, k.$

Where $f_q(a_k|a_i, a_{(t)})$ is the frequency of historical cases where asset $a_k$ was chosen by members of set $G_q$ following consumption of asset $a_i$ with available assets $a^{(t)}$, $\theta_q$ is the probability that the user belongs to $$G_q\left(\sum_{q=1}^{Q} \theta_q = 1\right),$$

and $\phi_{t-\delta}$ is the weight assigned to the historical observation based on its temporal age, $\delta$. Note that if the set of available assets, $a^{(t)}$, is too small to draw inferences, a different set $a'^{(t)}=a \cap a_i$ could be used instead. FIG. 16 illustrates an example of how the user—assigned to distinct groups—historical engagement data (following consumption of asset $a_i$) may be measured and, in FIG. 17, then transformed into group-level aggregate data for example users U1-U6. FIG. 18 shows how these aggregated data can then be used as the user-to-user similarities noting that, in the example, even though U6 does not have any engagement history, that user U6 will have a user-to-user similarity corresponding the group in which the user belongs. The selection of temporal weights can be driven by a discount parameter, $\phi \geq 0$ as depicted in FIG. 19. Note that, if $\phi=0$, the temporal weight is equivalent to the number of observations and less than the number of observation for any $\phi>0$. The value of $\phi$ can be chosen during the process of classifying the user-to-user behavior—various values can be explored during the optimization process such that, in addition to set of feature weighs, the paired temporal degrade function yields the smallest misclassification cost. FIG. 20 shows and example of how temporal weighting may affect the user-to-user similarity; in this example, all observation are given a weight of 1.0 with the exception of the U1's consumption of $a_i$ which is given a weight of 0.5—hence weighted average engagement is modified to reflect the temporal weighting and becomes 1.5/2.5 instead of ⅔ (which was the computed value prior to weighting).

Aggregating the Similarities

A composite metric would then be used as a probability $$p_{j,t+k} = \omega_{i,j}[\beta_1 \times s_1(a_i,a_j) + \beta_2 \times s_2(a_i,a_j)] + (1-\omega_{i,j})s_3(a_i,a_j)$$

where $$\beta_1, \beta_2, \beta_3 \geq 0, \beta_1 + \beta_2 = 1, 0 \leq \omega_{i,j} \leq 1$$

The relatives value of $\beta_1$ and $\beta_2$ (the asset-to-asset and user-to-asset components) can be based on the historical misclassification rates, $MC(s_r)$, of the two weighted similarities using an identical training set $$\beta_1 = \frac{MC(s_2)}{MC(s_2) + MC(s_1)},$$

$$\beta_2 = 1 - \beta_1$$

and $$\omega_1 = \left(1 - \frac{1}{\sqrt{\sum_{\delta=1}^{t-1} \theta_{t-\delta}}}\right)$$

and $\phi_{t-\delta}$ are the temporal weights observations in the training set used to derive $s_2(a_i,a_j)$ and $s(a_i,a_j)$.

3. Selecting and choosing the display order of asset recommendations during user engagement At each anticipated point in the user's decision cycle, t, the APM may present recommendations based on predicted user response. An automated selection system would allow the recommendations to be based on historical data, and an array of options could be presented. The limit on the number of potential recommendations, n', would be constrained by the physical limits on the display device. For example, in FIG. 5 (shown earlier) if asset $a_i$ is being consumed and n'=5 recommendations, $a_j^{(1)}, a_j^{(2)}, \ldots, a_j^{(n')}$, could be presented (the boxes on the right side of the figure) that are selected based on the optimization of the objective function using the composite probabilities, sequential choices of future assets, and known asset values.

Graph-Based Recommended Asset Selection

At the beginning of a consumption window, asset $a_i$ is selected by the user without the benefit of recommendations. The choice of the recommendations is then based upon the n' assets which have the highest expected revenue values based upon the sum of estimated probabilities, $p_{j,t+k}$ at time t+k (k=0, ..., K) and expected percentage of viewing time, $\pi_{j,t}$. The recommendations can be either one-step ahead (that is, recommendations of $a_j$ given current consumption of $a_i$) or looking forward to the entire sequence of decisions that may be made by the user. FIG. 21 depicts a depth of K=1 step-ahead process (the term depth is used to determine how many future decision points are being considered in the computation of the expected revenue). In this example, asset A is being consumed and an array of additional assets (not including A) are being considered for recommendation. In this graph-theoretic approach, the directed arcs between A and the remainder of the unconsumed asset portfolio is equivalent to the probabilities that each of those assets will be chosen next (in this simple example, no additional constraints have been applied and it is assumed that the proportional consumption window and asset values are uniform over the entire array. In this example, the three 'closest' assets, {C,B,F}, are selected for recommendation noting that the 'closeness' is equivalent to the composite similarities projected onto a [0,1] probability scale.

Should a depth of K=2 be considered in the revenue optimization exercise, the resulting decision process may be illustrated using FIG. 22. In this example, though asset C would have been selected in a depth K=1 decision, the probability that an additional asset would then be consumed after C is zero and hence no further revenue can be derived. However, if asset G were consumed instead, there would exist a non-zero probability that one of the array of assets {D, F, K, E} would also be viewed (again, the arc length is proportional to the probability of viewing based on the composite similarities). Therefore, extension of the depth of the search may lead to asset G replacing asset C as a recommendation since it is expected to yield a higher total revenue.

If the assumption that the asset values are uniform is relaxed, then a depth K=2 decision may also lead to a different set of recommendations. In FIG. 23, assets are given different values (more $=more value). In this case, the selection for recommended assets may be {B,G,C} instead of the {B,G,F} array selected under the assumption of uniform value.

Application of Constraints

The process for pursuit of the revenue-maximization objective has thus far been explained in the absence of any constraints. The display, user-specific, and APM constraints further shape the recommendations. One or more of the constraints will nearly always exist and so the modifications to the generation of recommendations to reflect these constraints becomes a practical necessity. The total constraint set is then $$\Lambda = \{\lambda_d, \lambda_p, \lambda_{APM}\}.$$

and so the constrained objective function for selecting recommendations to a single user at time t given an asset portfolio containing n' assets, $a^{(t)} \subseteq \{a_1, a_2, \ldots, a_{n'}\}$, may then may be expressed as:

maximize $$E_t(Z) = v_0 + \sum_{k=1}^{K} p_{j,t+k} \times f(\pi_{j,t+k}) \times (v_{j,t+k} + e_{j,t+k})$$

st $$\lambda = \{\lambda_d, \lambda_o, \lambda_{APM}\}.$$

$\lambda_p$: Available consumption time for the user

The allowable depth, k=1, ..., K, for any sequence of recommendations is limited by the available consumption time for each asset;

$$T - \sum_{\delta=1}^{t-1} \pi_{j,t-\delta} \tau_{j,t-\delta}$$

is the expected remaining total viewing time for the user at time t and where $\pi_{i,j+k}$ is the percentage of the asset viewing length consumed by the user in time t+k $\tau_j$ is the viewing length of asset $a_j$ T is the total available viewing time of all selected asset.

Importantly, it should be noted that if consumption is not possible given the online display system (i.e. when a tangible, non-electronic good requires delivery), the engagement time is limited only to the period during which the user devotes sensory attention to the online presentation. So, during selection of a sequence of eligible assets, the algorithm is constrained to only consider assets with an expected viewing length given total consumption time remaining.

$a^{(t)}$: Available assets that may considered for recommendation to the user

Among the potential candidates for recommendation at time k≤K, the eligible recommendation array is constrained to only contain those assets that are a) in the portfolio
b) contain the minimum of the number of assets that can be displayed given the device constraints, n' or a smaller number set by the APM, m<n',
b) not been consumed in previous engagements, $a^{(-t)}$ (An asset may be re-added to the eligible array of recommendation candidates if sufficient time has elapsed and the asset is not destroyed during consumption. For example, an edible good could not be recommended if it has already been consumed, but a video may be re-watched by a user.).
c) have not been prohibited by the APM, thereby augmenting the vector $a^{(-t)}$ due to business rules or other constraints on the minimum per-unit direct revenue for the asset, κ, or a linear combination of revenue set by the APM via the parameters $\{c,\phi\}$.
d) may require that certain assets a'* be present and perhaps in a particular position in the display—including the anchor asset that appears first in the display $a_i$
e) have length that, if included in the recommendation set, will not exceed the total available engagement time T for the user $y_p$. This implies also that the depth K can be restricted to avoid any presentation of assets that may only be partial consumed due to the available consumption window T:

$$K \to \text{floor}\left(\sum_{k=1}^{K} \pi_{j,t+k} \tau_j \le T\right). \quad \text{Equation 5}$$

$\sigma^2_t(Z)$: The revenue variance

Since the sequence of recommendations and their values is estimated, uncertainty exists with each decision made by the recommendation engine. This present the opportunity to allow for a capability to manage the risk associated with the forecasted revenue stream associated with a single user engagement and across all user engagements. The imposition of the variance constraint, allows the asset APM to reduce the risk associated with their recommendations. For example, if the manager desires to limit the expected revenue associated with a sequence of recommendations to +/−x %, then an appropriate variance tolerance can be set that will only yield recommendations that fit within their tolerance. In business scenarios, risk mitigation is a desirable outcome, and the proposed revenue calculations allow in this invention allow this to be explicitly attainable. It should be noted, however, that unusually tight bounds on the variance tolerance may significantly reduce the total expected revenue—a classic risk vs. reward tradeoff. The estimated variance of the revenue, can be computed at each step of the sequence and the recommendations limited to include only those assets which, if chosen in the expected order, will yield a value $\hat{\sigma}^2_t(Z)$ such that $\hat{\sigma}^2_t(Z) \le \sigma^2_t(Z)$.

Overall, the application of constraints to the recommendation process not only yields results that are displayable and acceptable to the APM and user, but lead to more computational efficiency. As the constraints essentially limit the number of available assets for consideration, the computation of expected revenues is also reduced.

Leveraging Historical User Information to Increase the Revenue from Dormant Assets There do exist cases where there is an asset or set of assets in a portfolio that the manager wishes to encourage consumption. For example, if there is an asset that has been in the inventory but has witnessed little consumption, the recommendation engine might be modified to build sequences of recommendations that are not optimal according to the constrained revenue approach. To do this, the asset manager might simply reduce the set of recommendations to include only those sequences that include the targeted asset for recommendation during the consumption window. This may be sub-optimal since there may a requirement to disqualify some recommendation sets yielding higher expected revenue in favor of exposing the dormant asset.

Asset Portfolio Manager Interaction with the Recommendation Engine

The processes associated with selection and ordering of items to be made available for consumption in an online environment is increasingly becoming more data-driven. The item portfolio manager has a wide range of data collection, analytical, and optimization tools that can be used to maximize a known objective—maximizing revenue from the sales derived from the online presentation of items. In many cases, however, there arises a need for the APM to apply business-specific rules, subject matter expertise, and risk mitigation into the processes used to select and display consumable items. Allowing this information to augment the presentation of items in a largely data-driven environment can be accomplished through a computer interface that presents the values of various input parameters used by the recommendation algorithms to a portfolio manager. The interface will then allow the APM to override some or all input values to ensure that the optimization process reflects the business environment. Additionally, the interface that allows the various input parameters to be explored in predictive, prescriptive, or mixed predictive/prescriptive mode.

In predictive mode, the interface will allow the portfolio manager to estimate the impact that his/her modifications to the input will have, if applied, on the target objective (revenue maximization).

In prescriptive mode, the interface will query the portfolio manager for value of the objective they desire to attain, then suggest a range of inputs that, if applied, are estimated to achieve the objective.

In the mixed predictive/prescriptive mode, the interface will allow the use to toggle between prescriptive and predictive modes to explore the various combinations of feasible input parameters that will achieve their objective, then select from the family of solutions that are most consistent with their business environment and objectives.

The portfolio manager may also wish to test the impact of a new set of values that both respect the known subject matter expertise, the operational constraints and the risk tolerance. By allowing the manager to incrementally modify input parameters, he/she will be able to determine which inputs variation may have the largest impact on the objective function and field and appropriate multivariate test into production.

Let;

$\Theta^*_t$ reflect the input parameters (a set of APM constraints $\lambda_{APM}$, user similarity weights $\psi$, and asset similarity weight w) determined by combining the subject matter expertise/business rules set by the APM when selecting the optimal set of recommendations for presentation at time t, where;

$\Theta^m_t$ are the APM-specified set input parameters determined at time t, $\Theta^c_t$ are the data-driven set input parameters determined by the recommendation algorithm at time t, and $\Theta^*_t$ is computed as follows:

$$\Theta^*_t = \alpha \Theta^m_t + (1-\alpha)\Theta^c_t \text{ and } 0 \leq \alpha \leq 1, \quad \text{[Equation 6]}$$

The APM may wish to fix $\alpha$, gradually adjust the value of $\alpha$ from a value of $\alpha=1$ (no machine-driven inputs) toward $\alpha=0$, or may select more abrupt temporal switches at times $t_1$ and $t_2$ as:

$\alpha = 1 \text{ if } t < t_1$ $0 \leq \alpha < 1 \text{ if } t_1 \leq t < t_2$ $\alpha = 0 \text{ if } t \geq t_2$.

Linkages Between the Interactive Display Made Available to the Portfolio Manger and the Recommendation Algorithm.

The transformation of data, features X, and an inventory of assets, a, into a set of recommendations is accomplished through the application of the set of input parameters, $\Theta$. The transformation itself is a complex process and may be accomplished through a linear or non-linear function that combines the various inputs to the system to generate a sorted subset or assets a'⊆a from the library's inventory. The transformation of raw data into a set of recommendations—and subsequent modifications to reflect risk, business environment and subject matter expertise—is performed by a single APM at a single location as shown in FIG. 24.

Using the Interactive Display in Predictive Mode

In predictive mode, the portfolio manager may use the interactive display to vary inputs to the recommendation algorithm and to determine the expected influence that the changes will have on their objective function. For example, for a given objective function, a user may vary the values of $\phi$ and n to determine what the effect will be by using various inputs as seen in Table 1. The tool could also be used for globally adjusting all input parameters by the scalar $\alpha$, which linearly combines the default values and the portfolio manager's values (see Tables 2 and 3).

TABLE 1

APM Selections for Prescriptive Mode

| Input Parameter | notation | Value | Objective Function |
|---|---|---|---|
| per Unit Multiplier | φ | 1 | 1.526 |
| | | 2 | 2.114 |
| | | 3 | 3.447 |

TABLE 1-continued

APM Selections for Prescriptive Mode

| Input Parameter | notation | Value | Objective Function |
|---|---|---|---|
| | | 4 | 4.310 |
| | | 5 | 5.267 |
| | | 6 | Not Possible |
| | | 7 | Not Possible |
| | | 8 | Not Possible |
| | | 9 | Not Possible |
| Number of assets | m | 1 | Disallowed |
| | | 2 | Disallowed |
| | | 3 | 3.674 |
| | | 4 | 4.320 |
| | | 5 | 5.535 |
| | | 6 | 5.552 |
| | | 7 | 5.152 |
| | | 8 | 4.160 |
| | | 9 | 3.725 |

TABLE 2

Various Values of α in Prescriptive Mode

| α | Objective Function | Objective Function Variance |
|---|---|---|
| 0 | 0.577 | 9% |
| 0.1 | 0.987 | 12% |
| 0.2 | 0.798 | 23% |
| 0.3 | 0.848 | 22% |
| 0.4 | 0.798 | 21% |
| 0.5 | 0.748 | 18% |
| 0.6 | 0.698 | 16% |
| 0.7 | 0.648 | 16% |
| 0.8 | 0.599 | 6% |
| 0.9 | 0.549 | 5% |
| 1 | 0.499 | 2% |

TABLE 3

Objective function and variance across all inputs, Θ

| Parameter | value |
|---|---|
| φ | 1.5 |
| N | 5 |
| K | $ 1.27 |
| K(U) | 1.1 |
| Objective Function | 0.987 |
| Objective Function Variance | 12.00% |

Using the Interactive Display in Prescriptive Mode

In the prescriptive mode, the portfolio manager sets a value of the objective function, and the interactive tool will then generate a set of input parameter values, if attainable, that could be used to achieve the desired solution. In that usage, the portfolio manager may be able to determine which solutions are feasible given constraints, and optimize. FIG. 25 illustrates the output of the exploratory tool that would result from setting specific objective function values, Z1 and Z2, and show the 'solution frontier' of feasible solutions and appropriate input variable combinations that are expected to yield that value. The interactive prescriptive mode may also be used as a tool for guiding A/B and multivariate test. For a given desired change in the objective function, the portfolio manager may determine the input parameter values that can be feasibly be deployed to realize the expected change. Thus, the interactive component may be viewed as a means of guiding online testing.

Repositioning Assets in the Recommendation Set

At times, there portfolio manager may be interested in influencing the membership of the recommendation set and it's ordering to attain a short-term objective such as presenting sale assets or clearing inventory. The interactive tool presented here allows, through the insertion of constraints applied to the allowable recommendation set, this reposition of asset in the display. An outcome of the interventions by the APM may result in a revised list of recommendations. FIG. 26 indicates a possible rearrangement of machine-generated recommended assets based on subject matter expertise, business environment, and risk tolerance. In the example, the list of recommended assets has been increased from 5 to 6 and asset F is considered by the APM to be a 'featured asset'. Application of other inputs by the portfolio manager in the example has additionally inserted asset L and swapped the ordering of assets A and D and replaced asset E with asset H.

7.0. Improving Recommendations Based on Affiliations

An embodiment improves the performance of any asset existing recommendation algorithm by transforming the raw input data by the algorithm into information (data in context) to enable the algorithm to more precisely generate asset recommendations and therefore improve the value of an objective function meant to be optimized. The APM need not have any understanding of how the recommendation system algorithms work, only that they have the ability—through various data transformations—to influence the outcomes of the recommendation to ensure they reflect known information that can ingested by the engine.

Group-Item Affiliations

Since the process of evaluating various partitioning strategies (see Appendix A) to determine if users should be separated into groups implies that each group can be delivered a more customized set of recommendations, there is a need to determine a correlation between group user preferences and the various assets that may be presented to them. The splitting variables may be any one or more of the available features, but the observed user behavior features can be leveraged to better match groups with assets available for display by the recommendation engine. Various metadata features may be available and which are used to describe not only each user and group historical interactions with the recommendation engine, by may also describe each asset in the complete set of assets, a. Among the list user behavior features with the various assets, association of user/group interactions with the assets and their keywords may be exploited to improve the performance of future group-specific recommendations. When the historical engagement behavior indicates that an identified group shows a common preference for assets possessing a particular set of keywords, future recommendations furnished to that group may prefer selection of other assets in a that share the same set of keywords.

An issue with using language-based keywords (or key phrases where appropriate) is that the their may exist various alternatives ways in which the keyword is represented in the asset metadata. Variable forms of expression may result for various reason—a non-exhaustive list of examples includes:

1. The keyword may have different part-of-speech meanings (e.g., the English term "train" may indicate a verb (to prepare), a noun (a locomotive or a trailing part of a garment)
2. Verbs and adverbs may be represented using various tenses (e.g., past, present, future)
3. Nouns many be represented using gender variants (e.g., le, la)
4. Misspellings may occur in the metadata (e.g., train/trein)
5. Missing keywords—there may be additional words that can be used as keyword metadata that are not yet known to the APM.

In an embodiment a method of normalizing keywords that accounts for variable ways of expressing the keyword. An embodiment explores auxiliary data to discover group-specific keywords that may be added to the metadata for each asset. A few of the goals are to:
 a) Increase keyword match rates.
 b) Increase the similarity among assets based on normalized expressions.
 c) Provide additional information that may be used in the partitioning process when a keyword similarity metric is employed as a feature.
 d) Provide more appropriate recommendations to groups based on the increased knowledge associated with the asset metadata.

In an embodiment, keyword normalization may be normalizing and expanding asset keyword metadata. The keyword normalization process can be applied in any language for which a dictionary exists where the dictionary contains parts of speech identifiers and both tense and gender variants of each word. The process is outline in FIGS. 27 and 28 assumes that the plurality of keywords describing all assets in the portfolio, a, is available. In FIG. 27, the list of n assets in the asset metadata in the leftmost table. In the keyword normalization process, the set of keywords are individually retrieved from a dictionary (or dictionaries) that define each keyword and their various parts-of-speech. For each keyword/part-of-speech combination, a step referred to as word stemming takes the keyword and determines the various tenses, pluralizations, and gender variants that refer to the same keyword. In the final step depicted in FIG. 28, each distinct keyword is mapped into the various forms in which it may be represented. This maps every keyword onto one-or-more variants and so each keyword, i=1, . . . , n has part-of-speech mi variants to which a mapping is now defined. With the keywords variants and their many-to-one mapping onto distinct keywords, an additional step may be performed that removes any keywords from the original keyword list of n assets that were also added in the multiplication process. This step is executed to ensure that the keywords are not duplicated and so that the mappings are unambiguous. Additionally, any keywords not found in the available dictionary can be removed from the keyword list.

With the keyword normalization process accomplished, it is now becomes possible for the asset portfolio manager to replace any asset keyword variant with its unique base keyword and to therefore improve asset keyword match rates. FIG. 29 indicates how this process may be leveraged for any keyword, whether it be a keyword that already exists in the keyword list, or an asset keyword unknown to the APM that is to be mapped into a known, unambiguous keyword. In this step, the keyword under evaluation is matched to the list of all known keyword variants. When the match occurs, the keyword is then replaced with its base, unambiguous keyword found in the list of n assets. If the keyword under evaluation is not matched to a known keyword variant, it is then added to the keyword dictionary and its variants are also defined and added to the variant keyword list—mapping the new keyword to its variants. If the keyword is not found in the dictionary (assumed to be an exhaustive list of language-specific words, where the dictionary may be augmented by the APM with acceptable terms not already present in the dictionary.), it is removed from the meta data for all assets in which it is associated. It should be noted that the term fuzzy match is used to describe the process by which a keyword under consideration is compared to the keyword list to see if is present.

Keyword matching is a process that allows for typographical errors of the expressed keywords to be allowable and considers the keywords to be considered identical if they are similar enough.

There are various metrics that may be used to execute a fuzzy match (e.g., the Levenshtein metric)—the selection of the metric may be made by the APM—this assumes that access to a matching (fuzzy or, if desired, crisp) is available to be used in keyword nominalization.

In keyword multiplication, a corpus of auxiliary data is leveraged, which is the plurality of available electronic text-based documents—excluding the keyword list—considered by the APM to contain information to be relevant to recommendation process and which asset keywords are likely to be present. These may include, but are not limited to: electronic databases, social media conversations, or online news and information sites. FIG. 29 shows a flow chart describing an embodiment of the keyword multiplication process. First, the keywords for assets selected by each group of users (assuming a partitioning exists) during historical engagements is built. Next, the auxiliary data is searched to determined which documents contain the keywords associated with each group and a term-frequency matrix is built which identifies the frequency in which any word that is mentioned in the same document with each keyword. Table 2 provides a depiction of a term-frequency matrix with the n keywords for group q represented in the rows, and other w terms found in the corpus of H auxiliary documents. The cell entries, $f_{u,v}$ contain the percentage of documents in which both keyword u and term u are both present:

$$f_{u,v} = \frac{\delta^h_{u,v}}{H}$$

where $\delta^h_{q,u}=1$ if both keyword u and term v are present in document h=1, . . . H.

For any term v not in the set of n keywords, the average number of documents in which the term is co-mentioned with a known keyword can be computed as:

$$f_v = \frac{1}{n}\sum_{u=1}^{n} f_{u,v}$$

and for any value of $f_v > f^*$ (a value determined by the APM), term v is added to the expanded keyword list. For each group q, the results of the keyword multiplication process result in an expanded keyword list reflecting an augmentation of the original group-specific keyword

TABLE 6

Keyword Frequencies

| Keyword | Word | | | |
|---|---|---|---|---|
| | 1 | 2 | ... | w |
| 1 | $f_{1,1}$ | $f_{1,2}$ | ... | $f_{1,w}$ |
| 2 | $f_{2,1}$ | $f_{2,2}$ | ... | $f_{2,w}$ |
| ... | ... | ... | ... | ... |
| n-1 | $f_{n-1,1}$ | $f_{n-1,2}$ | ... | $f_{n-1,w}$ |
| n | $f_{n,1}$ | $F_{n,2}$ | ... | $f_{n,w}$ | list with the keywords identified during the discovery process.

The expanded list of keywords for any group q may now be comprised on the full set of keywords (regardless of group) and the set of group-specific expanded keywords. With the total keyword list normalized and the group-specific keyword list now expanded based on auxiliary information, the results may be used by the group partitioning process and for generating recommendations that are more appropriate for the group(s) for which the targeted user is a member.

1) As shown in FIG. 30, the expanded keyword list can be used to improve the quality of dissimilarity metrics that reflect user engagement particularly the keyword feature. The set of keywords that reflect a particular user's history-based asset preferences can be determined. If the user's asset history. In FIG. 30, it is assumed that the user keyword list may contains some group-specific expanded keywords available in one or more expanded keyword lists of other groups in addition to keywords shared across the population of users. By comparing (after normalization of user-specific keywords) user specific keywords with group-specific keywords, the group partitioning process may leverage the increased quality of the keyword-based component of the dissimilarity (when assigning a user to a known group). When the user-specific keywords overlap with the keywords of a known group, the associated dissimilarity metric becomes smaller and increases the chances that the member belongs to the group(s) preferring assets with similar keyword. Hence, the keyword normalization and multiplication process enhance the information used in assigning a group label to a user and improves the chances that the correct group label was selected.

2) When the recommendation system is used to present specific, ordered list of assets to each user (and their group-level peers), the normalized and multiplied keyword list provide higher quality and additional information that may be used to better match assets with group preferences based on both a higher chance of group-item keyword matching and an increased effectiveness of group labeling of each user.

Bias Identification

The user engagement component of the feature set is based upon an implicit assumption that the various actions the user undertakes—and that are represented in the historical data—is objective. However, there does exist the possibility that cognitive bias is reflected in their behavior. Group-level partitioning of the data can be used to help identify and correct user-generated subjective bias that is used to make recommendations. A non-exhaustive list of reasons why cognitive bias in historical records of user engagements include:

1. The user interaction does not reflect the asset itself, but rather a related event such as the quality of delivery or some other outcome associated with the engagement (rather than the asset).
2. The user has strong brand loyalty and may engage the recommendation system in such as the way that the engagement reflects past interactions with associated assets, rather the assets being recommended. Conversely, the user's loyalty may cause him/her to interact with the system in ways that—rather than indicate brand loyalty—take action opposite actions to the detriment of competing brands.
3. The user has a bifurcated means of interacting with the recommendation system such as preferring the extreme or neutral possible ways of engaging the system when the range of interactions may be more continuous.

An embodiment identifies potential biases in online recommendations. Furthermore, once identified, bias correction may be accomplished by either offsetting the bias or ignoring the engagement activity when assigning groups and/or providing recommendations. In an example, for simplicity, assume that the user engagement history has only two possible outcomes (for example "like/dislike". "agree/disagree"). The mechanics of the proposed process for identifying bias can be expanded to engagements with multi-state interaction, but the basic methodology can be more effectively communicated under the assumptions of a binomial outcome. In probability theory, the binomial distribution can be used to model events that can take on only two states which may be referred to as a "success" and a "failure". The binomial distribution is expressed as:

$$f(x; n, \theta) = \binom{n}{x} \theta_x (1-\theta)^{n-x}$$

where $0 \leq \theta \leq 1$, n is the number of observed engagements, and x is the number of engagements that resulted in a success. To identify bias in a the member of a group, one would formulate a null hypothesis that the user's engagement is unbiased so that;

Null Hypothesis $H_o$: $\theta = \theta_o$

Alternative Hypothesis $H_A$: $\theta \neq \theta_o$ where $\theta_o$ is the proportion of successes for an unbiased user.

If, given the available data on a user's engagement, the observed value of $\theta$ is statistically different than $\theta_o$, the user's engagement data may be considered biased. For the application of this statistical test to be valid, it is assumed that the historical user data may be divided into two subsets: those data known to be free of bias and those data for which bias is suspected. It is only the subset of suspected biased data that bias identification is applied—the unbiased set is used as the baseline for determining qo. Separation of the data into the two subsets is a challenging endeavor and may not be possible in some cases. However, there are some cases where the separation is obvious: for example, to determine if the quality of asset delivery affects bias, the unbiased subset would include those engagements for which no deliver occurred, and those engagements that resulted in an asset delivery would be examined to uncover evidence of bias.

In this bias identification process, the user's actions may take on a value of 1 (success) or 0 (failure). Table 5 depicts a possible engagement set of outcomes for a particular user whose engagement is under consideration for being biased and where the sum of outcome is x=1 and the total number of success given n actions. The total percentage of success across all users in the unbiased subset of users is computed and assumes the value of $\theta_o$.

For each user i, the engagement history is examined and n and x are computed. At that point, a statistical test is performed using a threshold, $0 \leq \rho \leq 1$, set by the APM and equivalent to the confidence that the users measured success rate did not occur by chance, but rather due to a cognitive bias.

Using widely available statistical tables available in print or electronically for the binomial distribution, the APM may then look up the value p associated with the triplet $\{\theta_o, x, n\}$ and compare to a to make the following decision:

Assume the user's outcome is biased if $p \geq 1 + \rho/2$ or $p \leq 1 - \rho/2$ Assume the user's outcome is unbiased if $1 - \rho/2 < p < 1 + r/2$ After the presence of bias has been estimated for user i, the user's engagement data may be weighted with a value $0 \leq w_i \leq 1$ when computing recommendations or other operations related to grouping and feature-based similarity computations. If $w_i = 0$, the data estimated to be biased is ignored. For unbiased users, setting $w_i = 1$ is equivalent to giving full weight to the data (though it may be adjusted using other considerations). Values greater than 0 but less than 1 would be equivalent to down-weighting the data, but not fully ignoring it.

One way in which the precision of the bias identification process may be improved is to assume that some prior information about $\theta_o$ exists that may be used to formulate a Bayesian posterior distribution that combines both the binomial distribution and the prior information. If knowledge about $\theta_o$ can be assumed indicating that is has as specified mean and variance, then a beta distribution with parameters $\alpha, \beta$ may be used as a prior distribution for $\theta_o$.

$$P(\theta; \alpha, \beta) = \frac{\theta^{\alpha-1} 1 - \theta^{\beta-1}}{B(\alpha, \beta)}$$

This results in a posterior distribution with parameters $x+\alpha, (n-x)+\beta$:

$$P(\theta; x \Box x, n) = \frac{\theta^{x+\alpha-1} 1 - \theta^{(n-x)+\beta-1}}{B(x+\alpha, n-x+\beta)}$$

The use of a prior distribution is particularly useful when the user data is suspected to have some bias that is isolated to a particular group partition, where there exists at least three groups, and where one of the group's bias is expected to mirror another group's bias and the other groups are expected to be free of bias. One example would be users whose group assignments are based on feature that reflects known brand or franchise affiliation (a sports league is one example of this where a user may engage the recommendation system more favorably when the asset is related to their preferred team, less favorably for assets related to their teams' nemesis, and interact in an unbiased manner for assets associated with all other teams). In such a case, the prior distribution would reflect the converse (for the same asset, a success for the engagement with assets related to the affiliated brand would be matched with a failure for the engagement with assets reflecting the polarized opposite of their preference). Table 3 depicts an example of the converse outcomes that would be expected for actions preferred by a biased user. To populate the prior distribution and look up the appropriate p-values, α would reflect the number of failures in the converse case given n actions and β would reflect the (n−α) failures. The look up p-values would then correspond to those associated with a Beta(θ; α+x, β+(n−x)) distribution.

8.0 Continuous Play Video Recommendations

The system can use a version of any of the embodiments to maximize the revenue associated with video (a type of electronic asset) recommendations from each embodiment. The system allows a continuous-play feature that seamlessly builds a sequential set of videos that may be viewed without interruption. The feature allows an entire video playlist to be constructed and consumed and, should user interaction suggest that a particular video asset consumption has terminated, present a revised list of recommendations. The IRIS.TV recommendation system uses an unconstrained depth K=1 search without consideration of the user's available viewing time, risk tolerance of the revenue calculation, but does restrict choices to the available asset portfolio they manage. It is assumed that all assets have identical direct value, but no indirect value. Additionally, the probabilities derived from similarities set so that all of the probability is contained in the asset-to-asset similarities. FIGS. 31A-C, illustrate various continuous play implementations in use by the IRIS.TV recommendation system. The various cases, conditional upon consumption of the asset depicted in Case 1 (the anchor asset $a_i$) are:

Case 2: Recommended ordered playlist of assets following $a_i$. In this case, after the end of the consumption of the anchor asset, an ordered playlist appears in the same window as the anchor asset (with the anchor asset appearing in the same window in a thumbnail) and begins to play the next asset in the list.

Case 3. Continuously-played asset $a_j$ following $a_i$. Without selection and automated delivery, the next asset in the playlist begins to play automatically.

Case 4. Continuously-played asset $a_j$ (advertisement) following $a_i$. An advertisement (which may also be a recommended asset) is automatically delivered and begins playing.

Case 5. Alternative ordered playlist (non-continuous) following $a_i$. The continuous play functionality for one of the above cases is executed, but an alternative playlist also appears in the same viewport, allowing the user to generate a new playlist by selecting an asset (which becomes the anchor asset for a new playlist after selection).

Case 6. Hybrid ordered playlist where continuous play automatically loads next asset $a_j$ unless user selects a different asset the list.

9.0 Asset Portfolio Manager Interaction with Continuous Play Video Recommendations IRIS.TV is a media content distributor that displays video item recommendation to users engaging a variety of online sites using mobile and non-mobile electronic data providers. IRIS.TV:
1. Creates recommendations to a user based on an item (video) library
2. Increases video views and advertisement impressions
3. Ensures that content in a video item portfolio is monetized
4. Delivers analytics to learn the most valuable content in a client's video library
5. By operating as a supply-side platform (SSP) for online video, IRIS.TV utilizes data to increase engagement and provide solutions to assure that advertisements are delivered and advertisement rates are optimized.

An embodiment can use a version of the proposed invention to allow item portfolio managers to modify with their video recommendations based on the manager's subject matter expertise, business environment, and risk tolerance. Embodiments allow a continuous-play feature that seamlessly builds a sequential set of videos that may be viewed without interruption. The system allows for process called "stitching", where a sequential set of short-duration videos, perhaps containing advertisements is bundled into a single, uninterrupted stream—that, for purposes of the recommendation system, can be considered to be a single video. The feature allows an entire video playlist to be constructed and consumed and, should user interaction suggest that a particular video asset consumption has terminated, present a revised list of recommendations. Clients can manage video libraries that feature a wide variety of topics including (but non-exhaustive): sports, lifestyle, arts, news, and entertainment. As each client operates under a distinct set of operational constraints and possesses a distinct degree of subject matter expertise and risk aversion. The system allows this information to be applied without the requirement that the individual item portfolio managers understand the mechanics of the algorithms supporting the recommendation system. Instead, the portfolio managers interact with the algorithms through an interactive display.

In an embodiment, the system provides clients' item portfolio managers with the ability to use interactive controls to modify their business rules as depicted in FIG. 32.

In an embodiment, interactive components allow the item portfolio manager to:
  select an objective function (maximize revenue, maximize engagement time, etc.)
  set a "risk tolerance level" (ρ between 0 and 1) that, among all possible recommendations, yields a set of item recommendations with a risk metric at-or-below the $\rho^{th}$ percentile of possible recommendations and that optimize the objective function given that risk value
  allow feature content to be inserted into any recommendation set and in any position
  remove items that are not to be includes (example: do not show a comedic item in the same list as serious items)
  vary the input values associated with all other inputs to the recommendation system interactively
  Use the exploratory functions in either predictive, prescriptive or combined mode
    explore the expected impact on the objective function that would result by changing any combination of input values.
    define a target value of the objective function given the known constraints and allow the recommendation system to set the input values that would make the target value achievable
  design multivariate and A/B tests
  Allow the value of ρ to be changed interactively or according to a set time schedule.

10.0 Affiliation-Based Improvement to Continuous Play Video Recommendations

An embodiment allows clients to modify the set of videos with their video recommendations. The system provides a continuous-play feature that seamlessly builds a sequential set of videos that may be viewed without interruption. Importantly, the group partitioning, group labeling, keyword normalization and multiplication and bias identification/correction may be conducted by a single item portfolio manager located as a distinct geographic location.

The recommendation engine is a sophisticated set of algorithms that employ any combination of: demographic, geospatial, historical engagement data, including user-level features, video keywords that are used to partition the data into groups and provide group-level recommendations, etc. In many cases, where sufficient information on users exist, groups represent single users. Additionally, a user may sometimes engage the recommendation engine in one of the following modes:

a) as a single user seeking recommended videos that appeal to his/her interest and
b) as a representative of a household seeking recommendations for multiple users sharing a video engagement.

When the mode of the user can be distinctly determined using available data, the user/mode combination may assigned to different groups. For identification of groups and assignment of user/mode combinations to known groups, the methodology presented earlier in this document is employed. With a known objective function specified by the item portfolio manager—either one of the single clients responsible for maintaining the library of assets they own, or a curator/administrator granted authority to manage the video library for a client—recommendations are generated with a goal of optimizing the know objective. Beginning with an assumption that all user/mode pairs belong to a single group, observed feature data are used to iteratively split and the composite objective function is evaluated for each candidate split to determine the partition contours and to assign membership of each user/mode pair to one (if crisp classification is attainable or required) or more (if fuzzy classification is allowable and crisp classification is not possible). Over time, and as more feature data becomes available, group partitions and memberships are re-evaluated allowing for re-establishment of grouping rules when the objective function indicates a more desirable outcome where and/or user/mode membership probabilities in each resulting group change based on a subsequent evaluation of the updated, historical data.

The keyword normalization and multiplication methodology outlined earlier is also used by an embodiment to improve the quality and accuracy of keyword meta data that describes each distinct video. Each video library for which the recommendation system is used has a dominant theme describing the available assets in the library—the non-exhaustive list of themes includes sports, new, lifestyle, and brand-specific videos. The keywords in each thematic category are normalized using the language (English, Japanese, etc.) in which the keywords are expressed and theme-specific, electronically-stored social media sources and RSS feeds are used to fuel the multiplier process based on the co-mentions of the known keywords and other popular terms found in the electronic sources. Where group-specific keywords are available, the computation of the term-frequency matrix focus on a more specific subset of the electronic media sources in the keyword multiplication process. In those cases, the theme-specific frequencies used to populate the term-frequency matrix are restricted and based only on co-mentions found in sources expected to reference the individual group's interests. In the IRIS.TV embodiment, the keyword normalization and multiplication processes may be overridden by the item portfolio manager if he/she wishes to modify the keyword and variants list and the associated mappings. The process of normalization and multiplication of keys or the override of the resulting process may be conducted at any time to influence the quality of the keyword features.

The bias identification methodology is most commonly used in the libraries that have a sports-related theme. Sports team-level cognitive bias tends to pollute the historical engagement data for user/mode pairs that have strong team loyalties. In those cases, it has been observed that the feedback (like/dislike or star-ratings) tend to reflect the outcome of the event contained in the video rather than the video itself. When the outcome of an event is favorable for the team for which the user holds a strong affinity (for example, a home run that was hit by the baseball team for which the user is loyal), the biased user will—relative to an unbiased user—tend to give positive feedback. Conversely, if the opposing team or a team in which the user holds a strong disaffinity has a similar, successful outcome that is present in the event, the biased user will tend to give more negative feedback. To correct for this cognitive, affiliation-related event bias. IRIS.TV's recommendation identifies and down-weights the feedback that suggests a statistically-based evaluation that the feedback data is biased. In such cases, the historical data is subjected to the Bayesian-derived posterior beta distribution that uses the converse of the data from the users whose group membership indicates that they have an affinity for the opposing team as a prior distribution. The baseline data reflects the historical engagement data for the Q-3 groups (the data from the entire user population less: a) the data from the other users sharing the known affiliation as the user under consideration; b) the data from the users with an affiliation with opposing team represented in the some event encapsulated in the video; and c) the data from users who provided feedback on the event and are known to belong to those known to have a strong disaffinity for team favored by the user under evaluation).

11.0 Group Membership Assignment

Overview

The processes associated with selection and ordering of items to be made available for consumption in an online environment is increasingly becoming more data-driven. The candidate items that are eligible may be reduced to small number and selected by a recommendation algorithm that selects and orders the items for display to the online user. When the online user belongs to a group with common interests and known item preferences, the candidate item list may be significantly reduced to include items which better match those preferences. In the selection of the ordered, displayable items by the recommendation algorithm, there is an inferred assumption that all members of the group share similar preferences for items and that, absent any additional user-specific information, each member of the group may be presented with the same items in an online environment. If the $p^{th}$ user, $Y_p$, may belong to one-and-only-one group, $G_q$, the members may be partitioned into Q>1 distinct groups (Note that, if Q=1, then all users belong to the same group and so partitioning does not occur. Furthermore if $n_q$=1, then group q contains a single member user.):

$$G = G_1 \cup G_2 \cup \ldots \cup G_Q \text{ and } G_q \cap G_r = \emptyset \text{ for all } q, r$$

and if the total number of users across all groups is n then each group $G_q$ contains $n_q$ members, then $$n = n_1 + n_2 + \ldots + n_p \text{ and } 1 \le n_q \le n \text{ for all } q.$$

A well-crafted partitioning of users into Q>1 distinct, non-overlapping groups can improve the performance of item recommendation algorithms since each member of a group may be delivered a set of ordered items that reflect the observed preferences of the group, rather than the composite preferences of the entire set of users, n. In the special case where $n_q$=1, the group contains a single member and so the item recommendations can be specifically catered to that online user.

The challenges associated with partitioning users into distinct groups are outline in this application and include a multi-step process which can be accomplished by a single actor (the item portfolio manager, for example), at a single location. These steps may include:

Partitioning Users into Non-overlapping sets: Assigning users to groups based on observed or inferred features. This can be accomplished in three sub-steps:
 a) Identifying user characteristics (more commonly called features in the machine learning and pattern recognition fields) that are used to determine group membership. These features may be directly observable (for example, the user's gender, age, or location) or may be inferred by analyzing the historical behavior of users interaction with recommended items (for example, i) the user may only engage the recommended item list at certain times of the day, week or month, or ii) the user may reveal through online engagements that he/she is only interested in particular categories of items).
 b) Identifying known groups
 c) Using a classifier to assign each user to a known group based on an examination of its features and compared with the features of other member in each group.

An embodiment allows portfolio managers to identify features and groups, executing a partitioning operation that might improve the quality of recommendations and a more favorable value of the objective function.

An embodiment improves the performance of any item existing recommendation algorithm by transforming the raw input data by the algorithm into information (data in context) to enable the algorithm to more precisely generate item recommendations and therefore improve the value of an objective function meant to be optimized. The item portfolio manager need not have any understanding of how the recommendation system algorithms work, only that they have the ability, through various data transformations, to influence the outcomes of the recommendation to ensure they reflect known information that can ingested by the engine.

Partitioning Users into Non-Overlapping Sets

The objective of user partitioning in an online recommendation process is to assign a group label to each-and-every member in the population of interest. The population is the complete set of online users who have or will establish and online engagement with the recommendation engine.

A group label is unique symbolic representation of a group. In general notation, $G_q$ is an example of group label though more obvious, descriptive terms may be used such as "males", "females", "males under the age of 18", etc. When the number of groups requiring a label is unknown and the membership of each user is also unknown, the term unsupervised clustering is used. The goals of unsupervised clustering are to a) define a set of groups and associated labels and b) assign a label to each user indicating the group to which it belongs. When the $q=1, \ldots Q$ groups and labels are known, the partitioning process is known as supervised clustering—or alternatively, classification. The goal of classification is to assign one of the known group labels to each user. If membership assignment is not limited to a single group, a user may be assigned to more than one group with an expressed membership probability for each possible group. For example, if there are $q=1, \ldots, Q$ known groups and associated labels, then the probability the user $y_p$ belongs to group q is:

$$0 \le P(y_p \in G_q) \le 1 \text{ and } \sum_{q=1}^{Q} P(y_p \square G_q) = 1.$$

When it is allowable that $P(y_p \in G_q) < 1$ for at least 2 groups, the process is called fuzzy classification. Where the probability of belonging to group q is:

$P(y_p \in G_q) = 1$ and $P(y_p \in G_r) = 0 \forall r \ne q,$ then the process is called crisp classification and so the user is assigned a group label for one group to which membership is assigned. In an embodiment, assume that membership for each user is distributed proportionally over all groups for which $0 < P(y_p \in G_r) \le 1$ and that the list of groups and their labels are known. Applications of supervised classification when the groups and labels are known may also be called fuzzy classification. The use of a crisp classifier can be subsumed under this approach since, in some classification operations of users, there is only one group having nonzero, unit probability. This is equivalent to a crisp classification outcome.

Features: Each user has a set of known or inferred attributes—commonly referred to as features that describe the user. These may include user demographic features (e.g., age, gender, race, ethnicity, etc.), spatial features (e.g., city, state, country—or their latitude/longitude equivalents, etc.), user behavior features (e.g., frequency and length of historical engagements, site navigation data, known or inferred item preferences based on item keywords, etc.) as shown in Table 7. These features may be stored using an array of feature types including, but not limited to, nominal (continuous numeric or integers), binary (the absence or presence of a specific value of a feature such as male/female, on/off, has feature/does not have feature), multistate categorical (e.g., red/green/blue, USA/Canada/Japan), and ordinal multistate features where the ordering of the prescribed values is relevant (e.g. low/medium/high, strongly agree/agree/neutral/disagree, strongly disagree, etc.). The set of m features describing user $y_i$ may be presented as a vector:

$$x_j = \{x_1, x_2, \ldots, x_m\}$$

and a matrix of features across all $p=1, \ldots, P$ users may be stored in and P×k matrix X:

$$X = \begin{bmatrix} x_{1,1} & x_{1,2} & \ldots & x_{1,k-1} & x_{1,k} \\ x_{2,1} & x_{2,2} & \ldots & x_{2,k-1} & x_{2,k} \\ \ldots & \ldots & \ldots & \ldots & \ldots \\ x_{P-1,1} & x_{P-1,2} & \ldots & x_{P-1,k-1} & x_{P-1,k} \\ x_{P,1} & x_{P,2} & \ldots & x_{P,k-1} & x_{P,k} \end{bmatrix}$$

with the $p^{th}$ row describing the feature set of user $y_p$ and the $m^{th}$ ($m=1, \ldots, k$) column representing feature m. The value of $x_{p,m}$ would correspond to the value of the $m^{th}$ feature for user $y_p$

TABLE 7

Feature Types

| Feature Category | Feature |
|---|---|
| Spatial | Places |
| | Lat/Long |
| Demographic | Age |
| | Gender |
| | Race |
| | Ethnicity |
| User Behavior | Engagement history |
| | Preferences |
| | Keywords and other item metadata |

Feature Dissimilarity: A similarity between any two users, yp and yu, may be computed by aggregating pairwise differences in the various features (For binary, multi-state categorical, and mult-istate ordinal feature types, the features can easily be converted to a nominal scale to allow numeric computations. Furthermore, to ascribe all features to a common scale, it is common to rescale each feature to a [0,1] range. In the case of categorical values, the value could be $|x_{p,m} - x_{u,m}| = 0$ if $x_{t,m} = x_{u,m}$ and 1 otherwise.). When each feature value is rescaled to lie between [0.1], a more common approach is to compute the converse of similarity having desirable mathematical properties. One metricused to represent such a dissimilarity metric is the Minkowki metric:

$$d_{p,u} = \left\{ \sum_{m=1}^{k} w_m (x_{p,m} - x_{u,m})^\gamma \right\}^{1/\gamma} \quad 0 \le w_m \le 1,$$

$$\sum_{m=1}^{k} w_m, \gamma > 0$$

where $w_m$ are the weights assigned to each feature $m=1, \ldots k$ and $|x_{p,m}, \ldots x_{u,m}|$ is the numeric representation of the difference in the values of m features between user $y_p$ and user $y_u$. The pairwise aggregation of dissimilarity for all users can be stored an P×P dissimilarity matrix, D:

$$D = \begin{bmatrix} 1 & d_{1,2} & \ldots & d_{1,n-1} & d_{1,n} \\ d_{2,1} & 1 & \ldots & d_{2,n-1} & d_{2,n} \\ \ldots & \ldots & \ldots & \ldots & \ldots \\ d_{n-1,1} & d_{n-1,2} & \ldots & 1 & d_{n-1,n} \\ d_{n,1} & d_{n,2} & \ldots & d_{n,n-1} & 1 \end{bmatrix}$$

In some cases, feature m is not available in the data matrix for both $y_{ip}$ and $y_u$ and so a generalized version of the pairwise dissimilarity metric may be computed as:
where $$d_{p,u} = \frac{\sum_{m=1}^{k} w_m \delta_{p,u,m} d_{p,u,m}}{\sum_{m=1}^{k} w_m \delta_{p,u,m}}$$

where $\delta_{p,u,m} = \begin{cases} 0 & \text{if either } x_{p,m}, x_{u,m} \text{ do not exist} \\ 1 & \text{if both } x_{p,m}, x_{u,m} \text{ exist} \end{cases}$ Partitioning: Dividing the total users P into Q distinct groups is accomplished by leveraging a subset, k', of the known observable values of the various k features for each of the $p=1, \ldots, P$ users. As stated earlier, the partitioning of users into Q>1 groups is executed when the division of users into groups improves the values of the defined objective function set by the item portfolio manager. This is done by taking a random sample of L assets (selected from all $i=1, \ldots, n$ assets in the asset portfolio, a) and evaluating the expected revenue for the assets at the various time points for which historical engagement data exist. The decision to partition is based on an evaluation of the composite objective function, $Z_h$, over L assets given various "splits" of the total user base of P users into smaller partitions:

$$V_h = E(Z_h) = \sum_{t=1}^{T} \sum_{i=1}^{L} \sum_{q=1}^{Q} E_t(Z) \qquad \text{Equation A1}$$

give partition strategy h

Beginning with Q=1 (the total population of users), the objective function is evaluated and assessed as $V^* = V_1$. In the divisive approach, one of the k features is chosen as a splitting feature. If feature m has s possible states, then Q=s groups are assigned according to the partition strategy, h=1 and the value of the objective function, $V_1$, is computed and compared to $V_0$ (if the number of states, s, is large or the selected feature is a continuous variable, the feature values may be grouped into s'<s discrete intervals and the split would be based on the inclusion of the continuous value within the defined interval.). If $V_1$ yields a more favorable value than $V^*$, then the split is allowed yielding s groups. $G^{(1)} = \{G_1, G_2, \ldots, G_s\}$ and $V^*$ is set equal to $V_1$. If $V_1$ yields a less favorable value than $V^*$, then the split is disallowed and the partition process terminates. Otherwise, in the next splitting decision, another feature is chosen to further split $G_1$ into smaller partitions. The splitting strategy is then defined as p=1 based on the partitioning of $G^{(2)} = \{G^{(1)}_1, G^{(1)}_1, \ldots, G^{(t)}_1\}, \{G_2, G_3, \ldots, G_s\}$ where $\{G^{(1)}_1, G^{(1)}_1, \ldots, G^{(t)}_1\}$ reflects the further splitting of $G_1$ into its t distinct states based on another variable m'≠m. If the $G^{(2)}$ partitioning results in a more favorable value than the one resulting from $G^{(1)}$, the further splitting of $G_1$ is allowed—otherwise $G_1$ is not split and the process repeated for each of the s−1 groups using the same criteria.

Figure 33:
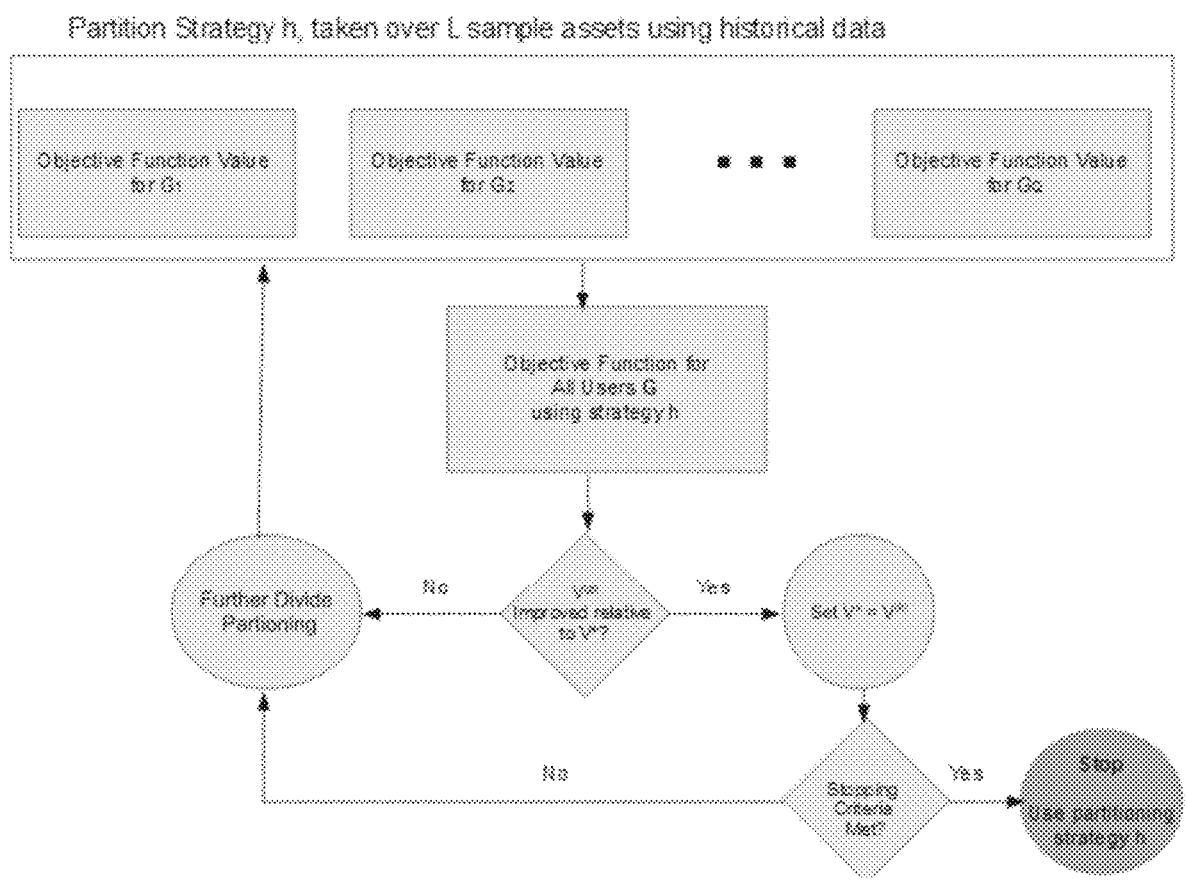
FIG. 33 illustrates an example iterative partitioning block diagram, according to an embodiment of the invention.

After executing this splitting evaluation over H possible partitioning strategies for which no further improvement are found, the partitioning iterative process terminates and the final groups are labeled a each user is then assigned to the group to which they belong at the time in which the objective function yielded the most favorable value (Another termination criterion may also be imposed that prohibits splitting of a partition if it would result in a total group membership roll having a very small number. Additionally, negligible improvements in the objective function for which the gain is too small: that is, disallow splits where $|V_h - V_{h-1}| < \varepsilon$ for some value of a determined by the portfolio manager.). The values of the individual, group-level contributions to the overall objective function and the flow of the iterative partitioning process is shown in FIG. 33. An example of a partitioning that may result by splitting on geographic region and sports team is shown in FIG. 34 and represented in a tree-diagram with 8 terminal nodes (representing the group assignments). For example, one group would contain all users from Europe regardless of team preference—while the US population of users is split among their preferred baseball team (e.g., one group is all Red Sox fans in the US).

Assigning Group Labels: Assignment of group labels may be done under one of two scenarios:
1) The user is assigned to the group when the user shares the same feature values as all other members of the group and for which the features used in the partitioning strategy are known for the user being assigned a group label.
2) A subset of the features used to define the partitioning strategy are unknown for the user for which a group label is to be assigned.

The second scenario presents a unique challenge since there is both a need to assign a group label to the user, but insufficient information exists to allow the labeling to be conducted with certainty. In such cases, supervised classification is an appropriate tool to deploy.

Assigning Group Labels to Users with Unobserved Values of Group-Defining Features: To assign a group label to every user missing one or more of the features used in the partitioning strategy used to define groups and label, $y_p$, a density is computed for every observation with features defined in X across all groups:

$$f(y_p|q=1), f(y_p, q=2), \ldots, f(y_p, q=Q), q=1, \ldots, Q.$$

Once the class densities are standardized so they sum to 1, the probability that the users belongs to each group is:

$$0 \leq P(Y_p \in G_q) \leq 1 \text{ and } \sum_{q=1}^{Q} P(y_p \square G_q) = 1.$$

The user is assigned to the group with the largest probability when "crisp" classification is desired, otherwise. "fuzzy" group a probabilities exist and the user may partially belong to more than one group.

For each member for which a group label needs to be assigned, $Y_i$, three steps are performed to determine a group membership label. If the missing feature data may be determined at a later date, the appropriate group label may then be assigned and the reclassification records may be used to further improve the classifier, the objective function, and possibly reassess the original partitioning results.

1) Use the dissimilarity matrix, D, to compute a kernel-weighted group density: A kernel is a method for transforming the original dissimilarity matrix into density that may assign less weight to the data from users that are more dissimilar (with respect to the pairwise comparison of features used to compute D) to the user being assigned a group label. There are many kernels that may be used to compute group densities (three examples are shown in FIG. 35 for a feature set having m=2 features). Use of a kernel does require some interaction with the item portfolio manager that can set a kernel parameter called the bandwidth, r. The bandwidth for kernels with bounded support (that is, with a finite value for which the group density is defined to be zero) can be set by the portfolio manager—in the event where the support is unbounded (the kernel has a positive value from 0–), the shape of the kernel can be determined by the choice of bandwidth. For example, the normal kernel is unbounded and the bandwidth value determines the inflection point of the kernel. It should be noted that, for a feature set having m features, the kernel always integrates to 1.

In this step, the feature set for the user being assigned a group label may be divided into three categories:

i) Features used in the partitioning of users into groups and for which the values are known
ii) Factures used in the partitioning of users into groups and for which the values are unknown
iii) Features not used in the partitioning of users into groups and for which the values are known When the subset of features falling in category i) exist (the user being assigned a group label has known values for all features used in the partitioning strategy), the group assignment is straightforward and the label can be assigned with certainty. If one or more of the subset of features fall into category ii) a group label is assigned using the subsets of observed features falling into categories i) and iii). Using the dissimilarity matrix. D, compute the kernel $K_q[d(y_p, y_u)]$ for every other observation that actually belongs to group $G_p$ excluding the observation under consideration and then compute the average. The pairwise densities reflect all users for which a group label has been assigned and for which yp shares identical values of the features used in the partitioning strategy (if there are not any, compute for every user).

$$f_q(y_p) = \frac{1}{n_q} \sum_{y_u \square G_q} K_p[d(y_p, y_u)] \forall \, p \neq u$$

2) Compute the Bayes posterior probability of $y_p$'s membership in each of K groups: and convert to as follows:

$$P(y_p \square G_q \square x_p) = \frac{\theta_q f_q(y_p)}{\sum_q^Q \theta_q f_q(y_p)}$$

where $\theta_q$ is the prior probability of $y_p$'s membership in group $G_q$. The posterior probability can assign equal weights to each class or some other pre-determined amount (e.g. the proportion of observations in that group).

3) Assign a group label:
a) If crisp classification is desired, assign observation $Y_i$ to the group $G_q$ that gives the maximum value of $P(y_p \in G_q | x_p)$ over all q=1, . . . , Q groups.
b) If fuzzy classification is desired, distribute the membership for observation $y_p$ to each group $G_q$ using the appropriate value of $P(y_p \in G_q | x_p)$.

A linkage ties the recommendation set for each group into the overall the partitioning division process. It is important to note that, if any split does not change the recommendations, it will therefore not have an impact on the overall objective function and that split will not occur. Hence, it is obvious that at least one of each sub-group that results from a split of an existing group will have a recommendation set that differs from the group that existed before the split. This direct linkage allows the following statement to be made: if user partitioning is applied, at least one of the final group-specific recommendation sets will be different than the recommendation set that would result if no partitioning was conducted. The primary importance is that the partitioning yields a more favorable value of the objective and the secondary importance is that each group can now be delivered a set of recommendations that are specifically customized for the members of each individual group.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

12.0 Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 36:
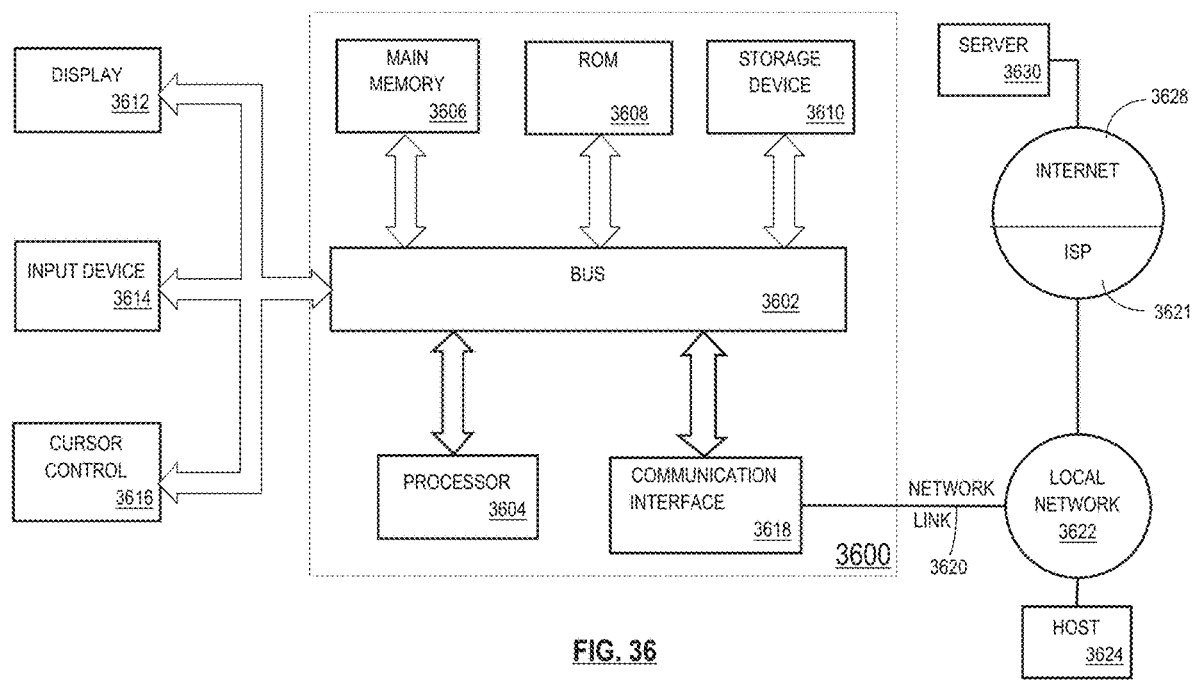
FIG. 36 illustrates a computer system upon which an embodiment may be implemented.

For example, FIG. 36 is a block diagram that illustrates a computer system 3600 upon which an embodiment may be implemented. Computer system 3600 includes a bus 3602 or other communication mechanism for communicating information, and a hardware processor 3604 coupled with bus 3602 for processing information. Hardware processor 3604 may be, for example, a general purpose microprocessor.

Computer system 3600 also includes a main memory 3606, such as a random access memory (RAM) or other dynamic storage device, coupled to bus 3602 for storing information and instructions to be executed by processor 3604. Main memory 3606 also may be used for storing temporary variables or other intermediate information during execution of instructions to be executed by processor 3604. Such instructions, when stored in non-transitory storage media accessible to processor 3604, render computer system 3600 into a special-purpose machine that is customized to perform the operations specified in the instructions.

Computer system 3600 further includes a read only memory (ROM) 3608 or other static storage device coupled to bus 3602 for storing static information and instructions for processor 3604. A storage device 3610, such as a magnetic disk, optical disk, or solid-state drive is provided and coupled to bus 3602 for storing information and instructions.

Computer system 3600 may be coupled via bus 3602 to a display 3612, such as a cathode ray tube (CRT), for displaying information to a computer user. An input device 3614, including alphanumeric and other keys, is coupled to bus 3602 for communicating information and command selections to processor 3604. Another type of user input device is cursor control 3616, such as a mouse, a trackball, or cursor direction keys for communicating direction information and command selections to processor 3604 and for controlling cursor movement on display 3612. This input device typically has two degrees of freedom in two axes, a first axis (e.g., x) and a second axis (e.g., y), that allows the device to specify positions in a plane.

Computer system 3600 may implement the techniques described herein using customized hard-wired logic, one or more ASICs or FPGAs, firmware and/or program logic which in combination with the computer system causes or programs computer system 3600 to be a special-purpose machine. According to one embodiment, the techniques herein are performed by computer system 3600 in response to processor 3604 executing one or more sequences of one or more instructions contained in main memory 3606. Such instructions may be read into main memory 3606 from another storage medium, such as storage device 3610. Execution of the sequences of instructions contained in main memory 3606 causes processor 3604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 3610. Volatile media includes dynamic memory, such as main memory 3606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 3602. Transmission media can also take the form of acoustic or light waves, such as those generated during radio-wave and infra-red data communications.

Various forms of media may be involved in carrying one or more sequences of one or more instructions to processor 3604 for execution. For example, the instructions may initially be carried on a magnetic disk or solid-state drive of a remote computer. The remote computer can load the instructions into its dynamic memory and send the instructions over a telephone line using a modem. A modem local to computer system 3600 can receive the data on the telephone line and use an infra-red transmitter to convert the data to an infra-red signal. An infra-red detector can receive the data carried in the infra-red signal and appropriate circuitry can place the data on bus 3602. Bus 3602 carries the data to main memory 3606, from which processor 3604 retrieves and executes the instructions. The instructions received by main memory 3606 may optionally be stored on storage device 3610 either before or after execution by processor 3604.

Computer system 3600 also includes a communication interface 3618 coupled to bus 3602. Communication interface 3618 provides a two-way data communication coupling to a network link 3620 that is connected to a local network 3622. For example, communication interface 3618 may be an integrated services digital network (ISDN) card, cable modem, satellite modem, or a modem to provide a data communication connection to a corresponding type of telephone line. As another example, communication interface 3618 may be a local area network (LAN) card to provide a data communication connection to a compatible LAN. Wireless links may also be implemented. In any such implementation, communication interface 3618 sends and receives electrical, electromagnetic or optical signals that carry digital data streams representing various types of information.

Network link 3620 typically provides data communication through one or more networks to other data devices. For example, network link 3620 may provide a connection through local network 3622 to a host computer 3624 or to data equipment operated by an Internet Service Provider (ISP) 3626. ISP 3626 in turn provides data communication services through the world wide packet data communication network now commonly referred to as the "Internet" 3628. Local network 3622 and Internet 3628 both use electrical, electromagnetic or optical signals that carry digital data streams. The signals through the various networks and the signals on network link 3620 and through communication interface 3618, which carry the digital data to and from computer system 3600, are example forms of transmission media.

Computer system 3600 can send messages and receive data, including program code, through the network(s), network link 3620 and communication interface 3618. In the Internet example, a server 3630 might transmit a requested code for an application program through Internet 3628, ISP 3626, local network 3622 and communication interface 3618.

The received code may be executed by processor 3604 as it is received, and/or stored in storage device 3610, or other non-volatile storage for later execution.

13.0 Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A method, comprising:
   creating a candidate list of multimedia assets from a plurality of multimedia assets for presentation to a user based on an anchor multimedia asset that is currently being consumed by the user;
   as the anchor multimedia asset is being consumed by the user:
      estimating an expected user viewing length of each multimedia asset in the candidate list of multimedia assets;
      estimating a total length of engagement based on historical interaction data, the total length of engagement represents an estimated total amount of time available to present a set of multimedia assets that follow the anchor multimedia asset to the user;
      selecting, in realtime, the set of multimedia assets from the candidate list of multimedia assets based on the expected user viewing length of a multimedia asset and a remaining estimated total length of engagement as other multimedia assets are selected for the set of multimedia assets;
      creating an ordered playlist of the set of multimedia assets;
      sending the ordered playlist to a receiving device.

2. The method of claim 1, wherein the selecting the set of multimedia assets is further based on a monetary estimate of the multimedia asset based on the expected user viewing length.

3. The method of claim 1, further comprising:
   creating a cumulative aggregation of engagement data for a particular multimedia asset from users that have indicated a preferred engagement with the particular multimedia asset.

4. The method of claim 1, further comprising:
   creating a cumulative aggregation of engagement data for a particular multimedia asset from users that have indicated a preferred engagement with the particular multimedia asset;
   wherein the users that have indicated a preferred engagement with the particular multimedia asset are determined to have similar characteristics.

5. The method of claim 1, further comprising:
   determining a monetary value associated with a length of engagement by a user for each multimedia asset in the list of multimedia assets within a window of engagement.

6. The method of claim 1, wherein the estimating the total length of engagement further comprises:
   assigning the user to a group to use group historical interaction data to estimate the total length of engagement.

7. The method of claim 1, wherein the estimating the total length of engagement further comprises:
   using historical interaction data of the user to estimate the total length of engagement.

8. The method of claim 1, wherein the anchor multimedia asset is selected by the user.

9. One or more non-transitory computer-readable storage media, storing one or more sequences of instructions, which when executed by one or more processors cause performance of:
   creating a candidate list of multimedia assets from a plurality of multimedia assets for presentation to a user based on an anchor multimedia asset that is currently being consumed by the user;
   as the anchor multimedia asset is being consumed by the user:
      estimating an expected user viewing length of each multimedia asset in the candidate list of multimedia assets;
      estimating a total length of engagement based on historical interaction data, the total length of engagement represents an estimated total amount of time available to present a set of multimedia assets that follow the anchor multimedia asset to the user;
      selecting, in realtime, the set of multimedia assets from the candidate list of multimedia assets based on the expected user viewing length of a multimedia asset and a remaining estimated total length of engagement as other multimedia assets are selected for the set of multimedia assets;
      creating an ordered playlist of the set of multimedia assets;
      sending the ordered playlist to a receiving device.

10. The one or more non-transitory computer-readable storage media of claim 9, wherein the selecting the set of multimedia assets is further based on a monetary estimate of the multimedia asset based on the expected user viewing length.

11. The one or more non-transitory computer-readable storage media of claim 9, further comprising:
    creating a cumulative aggregation of engagement data for a particular multimedia asset from users that have indicated a preferred engagement with the particular multimedia asset.

12. The one or more non-transitory computer-readable storage media of claim 9, further comprising:
  creating a cumulative aggregation of engagement data for a particular multimedia asset from users that have indicated a preferred engagement with the particular multimedia asset;
  wherein the users that have indicated a preferred engagement with the particular multimedia asset are determined to have similar characteristics.

13. The one or more non-transitory computer-readable storage media of claim 9, further comprising:
  determining a monetary value associated with a length of engagement by a user for each multimedia asset in the list of multimedia assets within a window of engagement.

14. The one or more non-transitory computer-readable storage media of claim 9, wherein the estimating the total length of engagement further comprises:
  assigning the user to a group to use group historical interaction data to estimate the total length of engagement.

15. The one or more non-transitory computer-readable storage media of claim 9, wherein the estimating the total length of engagement further comprises:
  using historical interaction data of the user to estimate the total length of engagement.

16. The one or more non-transitory computer-readable storage media of claim 9, wherein the anchor multimedia asset is selected by the user.

17. An apparatus, comprising:
  one or more processors; and
  a memory storing instructions, which when executed by the one or more processors, causes the one or more processors to:
    create a candidate list of multimedia assets from a plurality of multimedia assets for presentation to a user based on an anchor multimedia asset that is currently being consumed by the user;
    as the anchor multimedia asset is being consumed by the user:
      estimate an expected user viewing length of each multimedia asset in the candidate list of multimedia assets;
      estimate a total length of engagement based on historical interaction data, the total length of engagement represents an estimated total amount of time available to present a set of multimedia assets that follow the anchor multimedia asset to the user;
      select, in realtime, the set of multimedia assets from the candidate list of multimedia assets based on the expected user viewing length of a multimedia asset and a remaining estimated total length of engagement as other multimedia assets are selected for the set of multimedia assets;
      create an ordered playlist of the set of multimedia assets;
      send the ordered playlist to a receiving device.

18. The apparatus of claim 17, wherein the select the set of multimedia assets is further based on a monetary estimate of the multimedia asset based on the expected user viewing length.

19. The apparatus of claim 17, wherein the instructions, which when executed by the one or more processors, further causes the one or more processors to:
  create a cumulative aggregation of engagement data for a particular multimedia asset from users that have indicated a preferred engagement with the particular multimedia asset;
  wherein the users that have indicated a preferred engagement with the particular multimedia asset are determined to have similar characteristics.

20. The apparatus of claim 17, wherein the instructions, which when executed by the one or more processors, further causes the one or more processors to:
  determine a monetary value associated with a length of engagement by a user for each multimedia asset in the list of multimedia assets within a window of engagement.

* * * * *